United States Patent
Roux et al.

(10) Patent No.: US 7,194,450 B2
(45) Date of Patent: Mar. 20, 2007

(54) SYSTEMS AND METHODS FOR INDEXING EACH LEVEL OF THE INNER STRUCTURE OF A STRING OVER A LANGUAGE HAVING A VOCABULARY AND A GRAMMAR

(75) Inventors: Claude Roux, Grenoble (FR); Bernard Jacquemin, Grenoble (FR)

(73) Assignee: Xerox Corporation, Stamford, CT (US)

( * ) Notice: Subject to any disclaimer, the term of this patent is extended or adjusted under 35 U.S.C. 154(b) by 503 days.

(21) Appl. No.: 10/739,191

(22) Filed: Dec. 19, 2003

(65) Prior Publication Data
US 2005/0138000 A1    Jun. 23, 2005

(51) Int. Cl.
G06F 7/00 (2006.01)
G06F 17/00 (2006.01)
G06F 17/30 (2006.01)

(52) U.S. Cl. ............... 707/2; 707/1; 707/101
(58) Field of Classification Search ......... 707/1–10, 707/200–205, 101
See application file for complete search history.

(56) References Cited

U.S. PATENT DOCUMENTS

| | | | |
|---|---|---|---|
| 5,379,366 A | 1/1995 | Noyes | |
| 5,469,354 A * | 11/1995 | Hatakeyama et al. | 707/3 |
| 5,625,554 A | 4/1997 | Cutting et al. | |
| 5,717,912 A * | 2/1998 | Millett et al. | 707/3 |
| 5,742,816 A | 4/1998 | Barr et al. | |
| 5,963,940 A | 10/1999 | Liddy et al. | |
| 6,026,388 A | 2/2000 | Liddy et al. | |
| 6,112,204 A * | 8/2000 | Horowitz | 707/5 |
| 6,513,032 B1 * | 1/2003 | Sutter | 707/3 |
| 6,741,985 B2 * | 5/2004 | Green | 707/5 |
| 2002/0116176 A1 | 8/2002 | Tsourikov et al. | |

OTHER PUBLICATIONS

Y. Choueka, A.S. Fraenkel, S.T. Klein, E. Segal, "Improved Hierarchical Bit-Vector Compression in Document Retrieval Systems", ACM conference on Research and Development in Information Retrieval, 1986.*

Denis Rinfret, Patrick O'Neil, Elizabeth O'Neil, "Bit-Sliced Index Arithmetic", ACM SIGMOD, 2001.*

(Continued)

Primary Examiner—Hosain Alam
Assistant Examiner—Shew-fen Lin
(74) Attorney, Agent, or Firm—Oliff & Berridge, PLC

(57) ABSTRACT

Systems and methods for indexing and searching the inner structure of a string over a language having a vocabulary and a grammar using bit vectors. The index preserves the inner gramatical structure of the string while allowing for a fast search. A single search provides immediate access to every level of a document, without having to re-search a single string to determine which sub-parts of that string match the search string. When a string is indexed, the index maintains a compositional representation and the grammatical relationship between the elements of the vocabulary according to the language. The string is then indexed on different levels by disregarding some of the grammatical relationships of component levels.

34 Claims, 23 Drawing Sheets

OTHER PUBLICATIONS

Ari Visa, Technology of Text Mining, Machine Learning and Data Mining in Pattern Recognition, Second International Workshop, MLDM 2001. Proceedings (Lecture Notes in Artifical Intelligence Vo. 2123) 2001, pp. 1-11.

Mikko Kurimo, Fast Latent Semantic Indexing of Spoken Documents by Using Self-Organizing Maps, 2000 IEEE International Conference on Acoustics, Speech, and Signal Processing. Proceedings (Cat. No. 00CH37100), pp. 2425-2428 vol. 4.

Chengxiang Zhai, Xiang Tong et al., Evaluation of Syntactic Phrase Indexing—CLARIT NLP Track Report, Fifth Text Retrieval Conference(TREC-5) (NIST SP 500-238), 1997, pp. 347-357.

Rohini K. Srihari, Automatic Indexing and Content-Based Retrieval of Captioned Photographs, Proceedings of the Third International Conference on Document Analysis and Recognition, pp. 1165-1168 vol. 2.

* cited by examiner

| | FIRST SENTENCE |
|---|---|
| L1 | MOD_NEG(restored,not) |
| L2 | MOD(said,restored) |
| L3 | MOD(Smith,Comissaria) |
| L4 | MOD(prospects,improving) |
| L5 | MOD(levels,normal) |
| L6 | MOD(review,weekly) |
| L7 | MOD(zone,Bahia) |
| L8 | MOD(zone,cocoa) |
| L9 | MOD(levels,humidity) |
| L10 | MOD(coming,temporao) |
| L11 | DETD(week, the) |
| L12 | DETD(zone,the) |
| L13 | DETD(drought,the) |
| L14 | DETD(coming,the) |
| L15 | DETD(review,its) |
| L16 | VDOMAIN_PERFECT_PASSIVE(restored,have) |
| L17 | VDOMAIN(continued,continued) |
| L18 | VDOMAIN(said,said) |
| L19 | SUBJ(continued,Showers) |
| L20 | SUBJ(have,levels) |
| L21 | SUBJ(said,Smith) |
| L22 | NUCL_PASSIVE(been,restored) |
| L23 | NUCL_PERFECT(have,been) |
| L24 | OBJ(alleviating,drought) |
| L25 | COORD(and,prospects) |
| L26 | COORD(and,early January) |
| L27 | PREPD(prospects,since) |
| L28 | PREPD(review,in) |
| L29 | PREPD(coming,for) |
| L30 | PREPD(early January,since) |
| L31 | PREPD(zone,in) |
| L32 | PREPD(week,throughout) |
| L33 | CONNECTOR(restored,although) |
| L34 | MAIN(said) |
| L35 | HEAD(improving,improving) |
| L36 | HEAD(temporao,temporao) |
| L37 | HEAD(normal,normal) |
| L38 | HEAD(weekly,weekly) |
| L39 | HEAD(week,the week) |
| L40 | HEAD(zone,the Bahia cocoa zone) |
| L41 | HEAD(drought,the drought) |

FIG. 3

| FIRST SENTENCE (Continued from FIG. 3) | |
|---|---|
| L42 | HEAD(coming,the coming) |
| L43 | HEAD(levels,normal humidity levels) |
| L44 | HEAD(review,its weekly review) |
| L45 | HEAD(Showers,Showers) |
| L46 | HEAD(early January,early January) |
| L47 | HEAD(Smith,Comissaria Smith) |
| L48 | HEAD(prospects,improving prospects) |
| L49 | HEAD(week,throughout the week) |
| L50 | HEAD(zone,in the Bahia cocoa zone) |
| L51 | HEAD(early January,since early January) |
| L52 | HEAD(coming,for the coming) |
| L53 | HEAD(review,in its weekly review) |
| L54 | VMODPREP(continued,week,throughout) |
| L55 | VMODPREP(said,review,in) |
| L56 | VMODPREP(alleviating,early January,since) |
| L57 | VMODPREP(alleviating,propects,since) |
| L58 | VMODPREP(alleviating,early January,since) |
| L59 | S0(alleviation,alleviating) |
| L60 | S1H(restorer,restored) |
| L61 | S1(restorer,restored) |
| L62 | EMBED(restored,said) |
| L63 | OBJ-N(alleviating,drought) |
| L64 | OBJ-N(restored,said) |
| L65 | TIME(restored,early January) |
| L66 | TIME(restored,prospects) |
| L67 | NMODPREP(week,zone,in) |
| L68 | NMODPREP(prospects,coming,for) |

*FIG. 4*

| | SECOND SENTENCE |
|---|---|
| L154 | MOD(period,dry) |
| L155 | DETD(period,The) |
| L156 | DETD(temporao,the) |
| L157 | DETD(year,this) |
| L158 | VDOMAIN_MODAL(be,will) |
| L159 | VDOMAIN(means,means) |
| L160 | SUBJ(means,period) |
| L161 | SUBJ(will,temporao) |
| L162 | NUCL_MODAL(will,be) |
| L163 | NUCL(be,year) |
| L164 | NUCL(be,late) |
| L165 | OBJ(means,be) |
| L166 | MAIN(means) |
| L167 | MAIN(be) |
| L168 | HEAD(dry,dry) |
| L169 | HEAD(period,The dry period) |
| L170 | HEAD(year,this year) |
| L171 | HEAD(temporao,the temporao) |
| L172 | EMBED(be,means) |
| L173 | ATTRIB(temporao,year) |

*FIG. 5*

| THIRD SENTENCE | |
|---|---|
| L69 | MOD(total,cumulative) |
| L70 | MOD(stage,same) |
| L71 | MOD(year,last) |
| L72 | MOD(5.81,stage) |
| L73 | DETD(week,the) |
| L74 | DETD(total,a) |
| L75 | DETD(season,the) |
| L76 | DETD(stage,the) |
| L77 | QUANTD(bags,155,221) |
| L78 | QUANTD(kilos,60) |
| L79 | VDOMAIN(ended,Arrivals) |
| L80 | VDOMAIN(were,were) |
| L81 | SUBJ(ended,Arrivals) |
| L82 | SUBJ(were,22) |
| L83 | NUCL(were,bags) |
| L84 | OBJ(making,total) |
| L85 | PREPD(week,for) |
| L86 | PREPD(stage,at) |
| L87 | PREPD(5.81,against) |
| L88 | PREPD(5.93,of) |
| L89 | PREPD(season,for) |
| L90 | PREPD(kilos,of) |
| L91 | MAIN(ended) |
| L92 | MAIN(were) |
| L93 | OBJCOMPL(making,mln) |
| L94 | HEAD(cumulative,cumulative) |
| L95 | HEAD(same,same) |
| L96 | HEAD(week,the week) |
| L97 | HEAD(bags,155,221,bags) |
| L98 | HEAD(kilos,60 kilos) |
| L99 | HEAD(season,the season) |
| L100 | HEAD(stage,the same stage) |
| L101 | HEAD(year,last year) |
| L102 | HEAD(Arrivals,Arrivals) |
| L103 | HEAD(February,February) |
| L104 | HEAD(22,22) |
| L105 | HEAD(5.93,5.93) |
| L106 | HEAD(5.81,5.81) |
| L107 | HEAD(total,a cumulative total) |
| L108 | HEAD(mln,mln) |
| L109 | HEAD(week,for the week) |

*FIG. 6*

| THIRD SENTENCE (Continued from FIG. 6) ||
|---|---|
| L110 | HEAD(kilos,of 60 kilos) |
| L111 | HEAD(season,for the season) |
| L112 | HEAD(5.93,of 5.93) |
| L113 | HEAD(5.81,against 5.81) |
| L114 | HEAD(stage,at the same stage) |
| L115 | S1H(maker,making) |
| L116 | S1(maker,making) |
| L117 | OBJ-N(making,total) |
| L118 | ATTRIB(total,mln) |
| L119 | TIME(ended,February) |
| L120 | TIME(making,year) |
| L121 | NMODPREP(season,5.93,of) |
| L122 | NMODPREP(Arrivals,week,for) |
| L123 | NMODPREP(bags,kilos,of) |
| L124 | NMODPREP(total,season,for) |
| L125 | NMODPREP(mln,5.81,against) |

FIG. 7

| FOURTH SENTENCE | |
|---|---|
| L126 | MOD(seems,Again) |
| L127 | MOD(seems,delivered) |
| L128 | MOD(figures,arrivals) |
| L129 | DETD(figures,the) |
| L130 | VDOMAIN(was,was) |
| L131 | VDOMAIN(seems,seems) |
| L132 | VDOMAIN(delivered,delivered) |
| L133 | SUBJ(seems,it) |
| L134 | SUBJ(delivered,cocoa) |
| L135 | PREPD(figures,in) |
| L136 | PREPD(consignment,on) |
| L137 | CONNECTOR(delivered,that) |
| L138 | MAIN(seems) |
| L139 | HEAD(figures,the arrivals figures) |
| L140 | HEAD(it,it) |
| L141 | HEAD(cocoa,cocoa) |
| L142 | HEAD(consignment,consignment) |
| L143 | HEAD(consignment,on consignment) |
| L144 | HEAD(figures,in the arrivals figures) |
| L145 | VMODPREP(delivered,consignment,on) |
| L146 | VMODPREP(was,figures,in) |
| L147 | S0(inclusion,included) |
| L148 | S1H(deliverer,delivered) |
| L149 | S1(deliverer,delivered) |
| L150 | S2(inclusion,included) |
| L151 | EMBED(delivered,seems) |
| L152 | TIME(was,earlier) |
| L153 | NMODGEN(figures,arrivals) |

*FIG. 8*

|  | INDEX | ELEMENT | OCCURRENCE | POS. |
|---|---|---|---|---|
| L1001 | 0 | MOD | 18 | 4 |
| L1002 | 1 | NEG:_ | 1 | 5 |
| L1003 | 2 | PL:_ | 288 | 5 |
| L1004 | 3 | SG:_ | 585 | 5 |
| L1005 | 4 | P3:_ | 150 | 5 |
| L1006 | 5 | P2:_ | 106 | 5 |
| L1007 | 6 | P1:_ | 104 | 5 |
| L1008 | 7 | HMM_VPAST:_ | 30 | 5 |
| L1009 | 8 | SC_PTO:_ | 54 | 5 |
| L1010 | 9 | TRANS:_ | 154 | 5 |
| L1011 | 10 | PAST:_ | 121 | 5 |
| L1012 | 11 | PARTPAS:_ | 94 | 5 |
| L1013 | 12 | VERB:_ | 233 | 5 |
| L1014 | 13 | HMMSELECTION:_ | 999 | 5 |
| L1015 | 14 | LAST:_ | 419 | 5 |
| L1016 | 15 | restore | 12 | 2 |
| L1017 | 16 | FORM:FNOT | 4 | 5 |
| L1018 | 17 | NOTLY:_ | 36 | 5 |
| L1019 | 18 | ADV:_ | 36 | 5 |
| L1020 | 19 | FIRST:_ | 362 | 5 |
| L1021 | 20 | not | 2 | 0 |
| L1022 | 21 | HMM_VPAP:_ | 58 | 5 |
| L1023 | 22 | INDSPEECH:_ | 33 | 5 |
| L1024 | 23 | SC_TOINF:_ | 56 | 5 |
| L1025 | 24 | SC_SENTSUJ:_ | 30 | 5 |
| L1026 | 25 | SC_S:_ | 52 | 5 |
| L1027 | 26 | SC_PABOUT:_ | 16 | 5 |
| L1028 | 27 | say | 8 | 2 |
| L1029 | 28 | MAJ:_ | 94 | 5 |
| L1030 | 29 | MASC:_ | 10 | 5 |
| L1031 | 30 | COUNTABLE:_ | 166 | 5 |
| L1032 | 31 | HUMAN:_ | 20 | 5 |
| L1033 | 32 | FAM:_ | 26 | 5 |
| L1034 | 33 | PROPER:_ | 71 | 5 |
| L1035 | 34 | NOUN:_ | 583 | 5 |
| L1036 | 35 | smith | 5 | 1 |
| L1037 | 36 | Smith | 10 | 1 |
| L1038 | 37 | GUESS:_ | 66 | 5 |
| L1039 | 38 | Comissaria | 3 | 1 |
| L1040 | 39 | HMM_VERB:_ | 192 | 5 |
| L1041 | 40 | SC_PFOR:_ | 70 | 5 |

*FIG. 9*

| | INDEX | ELEMENT | OCCURRENCE | POS. |
|---|---|---|---|---|
| L1042 | 41 | prospect | 9 | 1 |
| L1043 | 42 | HMM_NOUN:_ | 74 | 5 |
| L1044 | 43 | VPROG:_ | 59 | 5 |
| L1045 | 44 | ADJ:_ | 168 | 5 |
| L1046 | 45 | improve | 5 | 1 |
| L1047 | 46 | level | 7 | 1 |
| L1048 | 47 | NADJ:_ | 88 | 5 |
| L1049 | 48 | normal | 5 | 0 |
| L1050 | 49 | review | 9 | 1 |
| L1051 | 50 | HMM_ADV:_ | 74 | 5 |
| L1052 | 51 | weekly | 6 | 0 |
| L1053 | 52 | zone | 10 | 1 |
| L1054 | 53 | Bahia | 4 | 1 |
| L1055 | 54 | cocoa | 8 | 1 |
| L1056 | 55 | humidity | 3 | 1 |
| L1057 | 56 | come | 9 | 1 |
| L1058 | 57 | temporao | 10 | 0 |
| L1059 | 58 | DETD | 13 | 4 |
| L1060 | 59 | PERIOD:_ | 84 | 5 |
| L1061 | 60 | week | 17 | 1 |
| L1062 | 61 | DEF:_ | 74 | 5 |
| L1063 | 62 | DET:_ | 94 | 5 |
| L1064 | 63 | the | 37 | 0 |
| L1065 | 64 | drought | 6 | 1 |
| L1066 | 65 | FORM:FIT | 16 | 5 |
| L1067 | 66 | HMM_PRON:_ | 26 | 5 |
| L1068 | 67 | PERSONAL:_ | 16 | 5 |
| L1069 | 68 | GEN:_ | 8 | 5 |
| L1070 | 69 | PRON:_ | 16 | 5 |
| L1071 | 70 | it | 8 | 0 |
| L1072 | 71 | VDOMAIN | 10 | 4 |
| L1073 | 72 | PERFECT:_ | 2 | 5 |
| L1074 | 73 | PASSIVE:_ | 2 | 5 |
| L1075 | 74 | FORM:FHAVE | 8 | 5 |
| L1076 | 75 | BF:_ | 8 | 5 |
| L1077 | 76 | SC_NP_TOINF:_ | 22 | 5 |
| L1078 | 77 | P_ON:_ | 16 | 5 |
| L1079 | 78 | AUXBH:_ | 63 | 5 |
| L1080 | 79 | PRES:_ | 38 | 5 |
| L1081 | 80 | have | 4 | 2 |
| L1082 | 81 | SC_ING:_ | 10 | 5 |
| L1083 | 82 | SC_PWITH:_ | 22 | 5 |

*FIG. 10*

| | INDEX | ELEMENT | OCCURRENCE | POS. |
|---|---|---|---|---|
| L1084 | 83 | continue | 5 | 2 |
| L1085 | 84 | SUBJ | 9 | 4 |
| L1086 | 85 | STARTBIS:_ | 42 | 5 |
| L1087 | 86 | START:_ | 42 | 5 |
| L1088 | 87 | Showers | 4 | 1 |
| L1089 | 88 | shower | 4 | 1 |
| L1090 | 89 | NUCL | 6 | 4 |
| L1091 | 90 | FORM:FBE | 55 | 5 |
| L1092 | 91 | COP:_ | 71 | 5 |
| L1093 | 92 | be | 33 | 2 |
| L1094 | 93 | OBJ | 3 | 4 |
| L1095 | 94 | HMM_ADJ:_ | 40 | 5 |
| L1096 | 95 | PROG:_ | 30 | 5 |
| L1097 | 96 | alleviate | 7 | 2 |
| L1098 | 97 | COORD | 2 | 4 |
| L1099 | 98 | FORM:FAND | 6 | 5 |
| L1100 | 99 | COORD:_ | 6 | 5 |
| L1101 | 100 | CONJ:_ | 14 | 5 |
| L1102 | 101 | and | 3 | 0 |
| L1103 | 102 | MWE:_ | 10 | 5 |
| L1104 | 103 | TEMPEXPR:_ | 85 | 5 |
| L1105 | 104 | MONTH:_ | 43 | 5 |
| L1106 | 105 | TIME:_ | 81 | 5 |
| L1107 | 106 | early | 12 | 0 |
| L1108 | 107 | early | 10 | 1 |
| L1109 | 108 | January | 10 | 1 |
| L1110 | 109 | PREPD | 14 | 4 |
| L1111 | 110 | FORM:FSINCE | 14 | 5 |
| L1112 | 111 | HMM_COSUB:_ | 38 | 5 |
| L1113 | 112 | SC_PSINCE:_ | 14 | 5 |
| L1114 | 113 | PREP:_ | 134 | 5 |
| L1115 | 114 | since | 7 | 0 |
| L1116 | 115 | FORM:FIN | 24 | 5 |
| L1117 | 116 | SC_PIN:_ | 36 | 5 |
| L1118 | 117 | P_IN:_ | 24 | 5 |
| L1119 | 118 | in | 12 | 0 |
| L1120 | 119 | FORM:FFOR | 24 | 5 |
| L1121 | 120 | for | 12 | 0 |
| L1122 | 121 | throughout | 4 | 0 |
| L1123 | 122 | CONNECTOR | 2 | 4 |
| L1124 | 123 | SUB:_ | 8 | 5 |
| L1125 | 124 | although | 2 | 0 |

*FIG. 11*

| INDEX | | ELEMENT | OCCURRENCE | POS. |
|---|---|---|---|---|
| L1126 | 125 | MAIN | 6 | 4 |
| L1127 | 126 | HEAD | 50 | 4 |
| L1128 | 127 | PERSON:_ | 2 | 5 |
| L1129 | 128 | VMODPREP | 7 | 4 |
| L1130 | 129 | S0 | 2 | 4 |
| L1131 | 130 | alleviation | 2 | 1 |
| L1132 | 131 | S1H | 3 | 4 |
| L1133 | 132 | restorer | 3 | 1 |
| L1134 | 133 | S1 | 3 | 4 |
| L1135 | 134 | EMBED | 3 | 4 |
| L1136 | 135 | OBJ_N | 3 | 4 |
| L1137 | 136 | TIME | 5 | 4 |
| L1138 | 137 | NMODPREP | 7 | 4 |
| L1139 | 138 | FIN:_ | 19 | 5 |
| L1140 | 139 | COMMA:_ | 6 | 5 |
| L1141 | 140 | PUNCT:_ | 14 | 5 |
| L1142 | 141 | _ | 7 | 0 |
| L1143 | 142 | SCBEGIN:_ | 2 | 5 |
| L1144 | 143 | NFIN:_ | 2 | 5 |
| L1145 | 144 | ENDBIS:_ | 8 | 5 |
| L1146 | 145 | SENT:_ | 8 | 5 |
| L1147 | 146 | END:_ | 8 | 5 |
| L1148 | 147 | period | 6 | 1 |
| L1149 | 148 | dry | 5 | 0 |
| L1150 | 149 | year | 11 | 1 |
| L1151 | 150 | FORM:FTHIS | 6 | 5 |
| L1152 | 151 | this | 3 | 0 |
| L1153 | 152 | MODAL:_ | 2 | 5 |
| L1154 | 153 | INF:_ | 17 | 5 |
| L1155 | 154 | FORM:FWILL | 8 | 5 |
| L1156 | 155 | AUX:_ | 8 | 5 |
| L1157 | 156 | will | 4 | 0 |
| L1158 | 157 | SC_PBY:_ | 14 | 5 |
| L1159 | 158 | SUBJ_CONT:_ | 14 | 5 |
| L1160 | 159 | mean | 7 | 2 |
| L1161 | 160 | late | 2 | 0 |
| L1162 | 161 | ATTRIB | 2 | 4 |
| L1163 | 162 | total | 9 | 0 |
| L1164 | 163 | cumulative | 5 | 1 |
| L1165 | 164 | stage | 9 | 1 |
| L1166 | 165 | SC_PAS:_ | 24 | 5 |
| L1167 | 166 | same | 6 | 1 |

*FIG. 12*

| | INDEX | ELEMENT | OCCURRENCE | POS. |
|---|---|---|---|---|
| L1168 | 167 | PREPERIOD:_ | 6 | 5 |
| L1169 | 168 | last | 3 | 0 |
| L1170 | 169 | CARD:_ | 52 | 5 |
| L1171 | 170 | DEC:_ | 30 | 5 |
| L1172 | 171 | DIG:_ | 60 | 5 |
| L1173 | 172 | 5_81 | 8 | 0 |
| L1174 | 173 | INDEF:_ | 6 | 5 |
| L1175 | 174 | a | 3 | 0 |
| L1176 | 175 | season | 9 | 1 |
| L1177 | 176 | QUANTD | 2 | 4 |
| L1178 | 177 | bag | 6 | 1 |
| L1179 | 178 | 155_221 | 3 | 0 |
| L1180 | 179 | kilo | 8 | 1 |
| L1181 | 180 | 60 | 4 | 0 |
| L1182 | 181 | P_OFF:_ | 26 | 5 |
| L1183 | 182 | P_UP:_ | 46 | 5 |
| L1184 | 183 | end | 6 | 2 |
| L1185 | 184 | arrival | 10 | 1 |
| L1186 | 185 | 22 | 4 | 0 |
| L1187 | 186 | FORM:FMAKE | 14 | 5 |
| L1188 | 187 | SC_NP_ADJPRED:_ | 14 | 5 |
| L1189 | 188 | SC_NP_NPPRED:_ | 14 | 5 |
| L1190 | 189 | SC_PINTO:_ | 14 | 5 |
| L1191 | 190 | SC_PFROM:_ | 14 | 5 |
| L1192 | 191 | SC_POF:_ | 46 | 5 |
| L1193 | 192 | P_OVER:_ | 14 | 5 |
| L1194 | 193 | P_OUT:_ | 14 | 5 |
| L1195 | 194 | make | 7 | 2 |
| L1196 | 195 | FORM:FAT | 6 | 5 |
| L1197 | 196 | SC_PAT:_ | 6 | 5 |
| L1198 | 197 | at | 3 | 0 |
| L1199 | 198 | SC_PAGAINST:_ | 8 | 5 |
| L1200 | 199 | against | 4 | 0 |
| L1201 | 200 | 5_93 | 7 | 0 |
| L1202 | 201 | FORM:FOF | 16 | 5 |
| L1203 | 202 | of | 8 | 0 |
| L1204 | 203 | OBJCOMPL | 1 | 4 |
| L1205 | 204 | mln | 6 | 0 |
| L1206 | 205 | February | 4 | 1 |
| L1207 | 206 | maker | 3 | 1 |
| L1208 | 207 | seem | 8 | 2 |
| L1209 | 208 | again | 2 | 0 |

*FIG. 13*

| INDEX | | ELEMENT | OCCURRENCE | POS. |
|---|---|---|---|---|
| L1210 | 209 | deliver | 10 | 2 |
| L1211 | 210 | figure | 10 | 1 |
| L1212 | 211 | PRONPERS:_ | 8 | 5 |
| L1213 | 212 | OBL:_ | 8 | 5 |
| L1214 | 213 | NOM:_ | 8 | 5 |
| L1215 | 214 | consignment | 7 | 1 |
| L1216 | 215 | SC_PON:_ | 8 | 5 |
| L1217 | 216 | on | 4 | 0 |
| L1218 | 217 | FORM:FTHAT | 4 | 5 |
| L1219 | 218 | that | 2 | 0 |
| L1220 | 219 | inclusion | 3 | 1 |
| L1221 | 220 | include | 3 | 2 |
| L1222 | 221 | deliverer | 3 | 1 |
| L1223 | 222 | S2 | 1 | 4 |
| L1224 | 223 | COMPAR:_ | 4 | 5 |
| L1225 | 224 | NMODGEN | 1 | 4 |

*FIG. 14*

| DOCUMENT INDEX |||||||
|---|---|---|---|---|---|---|
| | ID FILE | ID PARAGRAPH | ID SENTENCE | RANK | BINARY | VALUE |
| L2001 | 0 | -1 | -1 | 0 | 1111111111111111 | 65535 |
| L2002 | 0 | -1 | -1 | 1 | 1111111111111111 | 65535 |
| L2003 | 0 | -1 | -1 | 2 | 1111111111111111 | 65535 |
| L2004 | 0 | -1 | -1 | 3 | 1111111111111111 | 65535 |
| L2005 | 0 | -1 | -1 | 4 | 1111111111111111 | 65535 |
| L2006 | 0 | -1 | -1 | 5 | 1111111111111111 | 65535 |
| L2007 | 0 | -1 | -1 | 6 | 1111111111111111 | 65535 |
| L2008 | 0 | -1 | -1 | 7 | 1111111111111111 | 65535 |
| L2009 | 0 | -1 | -1 | 8 | 1111111111111111 | 65535 |
| L2010 | 0 | -1 | -1 | 9 | 1111111111111111 | 65535 |
| L2011 | 0 | -1 | -1 | 10 | 1111111111111111 | 65535 |
| L2012 | 0 | -1 | -1 | 11 | 1111111111111111 | 65535 |
| L2013 | 0 | -1 | -1 | 12 | 1111111111111111 | 65535 |
| L2014 | 0 | -1 | -1 | 13 | 1111111111111111 | 65535 |
| L2015 | 0 | -1 | -1 | 14 | 0000000000000001 | 1 |

*FIG. 15*

| PARAGRAPH INDEX |||||||
|---|---|---|---|---|---|---|
| | ID FILE | ID PARAGRAPH | ID SENTENCE | RANK | BINARY | VALUE |
| L2016 | 0 | 0 | -1 | 0 | 1111111111111111 | 65535 |
| L2017 | 0 | 0 | -1 | 1 | 1111111111111111 | 65535 |
| L2018 | 0 | 0 | -1 | 2 | 1111111111111111 | 65535 |
| L2019 | 0 | 0 | -1 | 3 | 1111111111111111 | 65535 |
| L2020 | 0 | 0 | -1 | 4 | 1111111111111111 | 65535 |
| L2021 | 0 | 0 | -1 | 5 | 1111111111111111 | 65535 |
| L2022 | 0 | 0 | -1 | 6 | 1111111111111111 | 65535 |
| L2023 | 0 | 0 | -1 | 7 | 1111111111111111 | 65535 |
| L2024 | 0 | 0 | -1 | 8 | 1111111111111111 | 65535 |
| L2025 | 0 | 0 | -1 | 9 | 1111111111111111 | 65535 |
| L2026 | 0 | 0 | -1 | 10 | 1111111111111111 | 65535 |
| L2027 | 0 | 0 | -1 | 11 | 1111111111111111 | 65535 |
| L2028 | 0 | 0 | -1 | 12 | 1111111111111111 | 65535 |
| L2029 | 0 | 0 | -1 | 13 | 1111111111111111 | 65535 |
| L2030 | 0 | 0 | -1 | 14 | 0000000000000001 | 1 |

*FIG. 16*

| FIRST SENTENCE | | | | | | |
|---|---|---|---|---|---|---|
| | ID FILE | ID PARAGRAPH | ID SENTENCE | RANK | BINARY | VALUE |
| L2031 | 0 | 0 | 0 | 0 | 1111111111111111 | 65535 |
| L2032 | 0 | 0 | 0 | 1 | 1111111111111111 | 65535 |
| L2033 | 0 | 0 | 0 | 2 | 1111111111111111 | 65535 |
| L2034 | 0 | 0 | 0 | 3 | 1111111111111111 | 65535 |
| L2035 | 0 | 0 | 0 | 4 | 1111111111111111 | 65535 |
| L2036 | 0 | 0 | 0 | 5 | 1111111111111111 | 65535 |
| L2037 | 0 | 0 | 0 | 6 | 1111111111111111 | 65535 |
| L2038 | 0 | 0 | 0 | 7 | 1111111111111111 | 65535 |
| L2039 | 0 | 0 | 0 | 8 | 1111111111111111 | 65535 |
| L2040 | 0 | 0 | 0 | 9 | 0000000000000111 | 7 |

*FIG. 17*

| SECOND SENTENCE | | | | | | |
|---|---|---|---|---|---|---|
| | ID FILE | ID PARAGRAPH | ID SENTENCE | RANK | BINARY | VALUE |
| L2041 | 0 | 0 | 1 | 0 | 0111001100011101 | 29469 |
| L2042 | 0 | 0 | 1 | 1 | 0101001111001110 | 21454 |
| L2043 | 0 | 0 | 1 | 2 | 1001010110100100 | 38308 |
| L2044 | 0 | 0 | 1 | 3 | 1110111000000100 | 60932 |
| L2045 | 0 | 0 | 1 | 4 | 1101000010000100 | 53380 |
| L2046 | 0 | 0 | 1 | 5 | 0111111001110000 | 32368 |
| L2047 | 0 | 0 | 1 | 6 | 0000001010000000 | 640 |
| L2048 | 0 | 0 | 1 | 7 | 0110000000000000 | 24576 |
| L2049 | 0 | 0 | 1 | 8 | 0011010001000000 | 13376 |
| L2050 | 0 | 0 | 1 | 9 | 1111111111111111 | 65535 |
| L2051 | 0 | 0 | 1 | 10 | 0000000000000011 | 3 |

*FIG. 18*

| THIRD SENTENCE | | | | | |
|---|---|---|---|---|---|
| | ID FILE | ID PARAGRAPH | ID SENTENCE | RANK | BINARY | VALUE |
| L2052 | 0 | 0 | 2 | 0 | 0111111001111101 | 32381 |
| L2053 | 0 | 0 | 2 | 1 | 0101000000101000 | 20520 |
| L2054 | 0 | 0 | 2 | 2 | 1001110110100110 | 40358 |
| L2055 | 0 | 0 | 2 | 3 | 1111110000000100 | 64516 |
| L2056 | 0 | 0 | 2 | 4 | 0100000010000100 | 16516 |
| L2057 | 0 | 0 | 2 | 5 | 1111111001110100 | 65140 |
| L2058 | 0 | 0 | 2 | 6 | 1010001110000000 | 41856 |
| L2059 | 0 | 0 | 2 | 7 | 0110000110010010 | 24978 |
| L2060 | 0 | 0 | 2 | 8 | 0011011110101000 | 14248 |
| L2061 | 0 | 0 | 2 | 9 | 0000000000100111 | 39 |
| L2062 | 0 | 0 | 2 | 10 | 1111111111111110 | 65534 |
| L2063 | 0 | 0 | 2 | 11 | 1111111111111111 | 65535 |
| L2064 | 0 | 0 | 2 | 12 | 0111111111111111 | 32767 |

*FIG. 19*

| FOURTH SENTENCE | | | | | |
|---|---|---|---|---|---|
| | ID FILE | ID PARAGRAPH | ID SENTENCE | RANK | BINARY | VALUE |
| L2065 | 0 | 0 | 3 | 0 | 0111111011111101 | 32509 |
| L2066 | 0 | 0 | 3 | 1 | 0101001010101110 | 21166 |
| L2067 | 0 | 0 | 3 | 2 | 0000000010000100 | 132 |
| L2068 | 0 | 0 | 3 | 3 | 1110001001000100 | 58436 |
| L2069 | 0 | 0 | 3 | 4 | 1110000011101010 | 57578 |
| L2070 | 0 | 0 | 3 | 5 | 0101110001110000 | 23664 |
| L2071 | 0 | 0 | 3 | 6 | 0010011010010000 | 9872 |
| L2072 | 0 | 0 | 3 | 7 | 0110110001111010 | 27770 |
| L2073 | 0 | 0 | 3 | 8 | 1111010101101011 | 62827 |
| L2074 | 0 | 0 | 3 | 9 | 0000000000000111 | 7 |
| L2075 | 0 | 0 | 3 | 11 | 1000000101000000 | 33088 |
| L2076 | 0 | 0 | 3 | 12 | 1000000000000000 | 32768 |
| L2077 | 0 | 0 | 3 | 13 | 1111111111111111 | 65535 |
| L2078 | 0 | 0 | 3 | 14 | 0000000000000001 | 1 |

*FIG. 20*

SYSTEMS AND METHODS FOR INDEXING EACH LEVEL OF THE INNER STRUCTURE OF A STRING OVER A LANGUAGE HAVING A VOCABULARY AND A GRAMMAR

BACKGROUND OF THE INVENTION

1. Field of Invention

This invention relates to systems and methods for analyzing strings over a language.

2. Description of Related Art

There are many conventional systems and methods for storing and indexing each level of the inner structure of a string over a language having a vocabulary and a grammar. The most familiar are the various "search engines" that are available for use on the Internet. Conventional search engines typically allow a user to input a search string. Then, the search string is compared against the text of an entire document or a summary of its contents. Unfortunately, accurately searching the entire text of a large number of documents is extremely resource intensive. Therefore, conventional search engines are limited by two major design constraints, accuracy and speed. As a result, for example, many search engines available to search Internet web pages, typically return far less than all of the possible web pages that match the search string, in order to cut down on the time required for the search.

Equally disadvantageous, many of the conventional search engines return results in which only the vocabulary of the search string is matched. Typically, the conventional search engine returns documents containing the same words or string of words, however, the grammatical relationship between the words in the search string is ignored. As a result, many documents returned as a match may contain a random combination of the terms in the search string but in a totally unrelated context.

Some search engines have tried to preserve a crude representation of the grammatical relationships in the search string while searching documents by returning documents in which the words of the search string are only separated by a user defined number of words, for instance, ten words. However, this system requires complex operators within the search string to define the acceptable distance between words of the search string in the document. Furthermore, it does not preserve the actual grammatical relationship between the words in the search string, but only attempts to very roughly approximate a grammatical relationship due to the proximity of the words.

Other conventional and somewhat more complex indexing systems use "tokens" to define an axis in a multi-vector environment. An example of one such system is the SMART system. In SMART, a "token" is a single word or multi-word expression. According to the SMART system, each token defines an axis in a multi-vector environment. A document is first decomposed into a list of its tokens. Each token is used to define a vector that specifies the position of that document in the multi-axis representation. Each non-zero value of a vector corresponds to a token that is actually present in the document. A value of a vector is computed on the basis of the number of times a token occurs in a document compared to the number of times that token occurs in all of the indexed documents. When a query is matched against a set of documents during a search, a specific vector is computed for the query. Then, the cosine of the query's vector is compared to the cosine of each of the document vectors as an approximation of the proximity between the query and the document.

The primary disadvantage of these vector based systems is that the comparison approximating the similarity between a query and documents is made through a global calculus. Once that global calculus is made, each document that was determined to be similar must be individually reanalyzed to determine which sub-parts match. Furthermore, the vector systems do not maintain the grammatical relationship between the words of a document, but rely on token phrases to approximate grammatical relationships. Frequently these token phrases do not accurately represent the specific grammatical relationship of the search string.

SUMMARY OF THE DISCLOSURE

This invention provides systems and methods for creating an index of a document.

This invention separately provides systems and methods for indexing a document that preserves grammatical relationships between elements of the document.

This invention separately provides systems and methods for indexing a document that preserves relationships between and/or within portions of the document.

This invention separately provides systems and methods for creating an index that allows portions of a document to be separately searched.

This invention separately provides systems and methods for creating an index from a document that separately indexes various document portions.

Various exemplary embodiments of the systems and methods according to this invention index the inner structure of a string over a language having a vocabulary and a grammar (e.g., a document with text) while preserving the inner grammatical structure of the string and/or allowing for a fast search. In various exemplary embodiments, a single search provides immediate access to every level of a document, without having to re-search a single string to determine which sub-parts of that string match the search string.

In various exemplary embodiments of the systems and methods according to this invention, when a string is indexed, the index maintains a compositional representation of the structural units of the string. In various exemplary embodiments, the index maintains the grammatical relationship between the elements of the vocabulary according to the language within the documents. The string is then indexed on different levels (n) by disregarding some of the grammatical relationships of component levels (n−1).

A textual document written in contemporary English is one example of a particular string over a language having a vocabulary and a grammar. The document (string) contains a vocabulary, i.e. the English words that compose the various sentences and paragraphs, and a grammar, i.e., the English grammar rules that dictate the placement of the various words. In various exemplary embodiments of the systems and methods according to this invention, the document is indexed on a number of levels according to the grammar of the language. For example, the index may contain a representation of the entire document, a representation of each paragraph within the document, a representation of each sentence within each paragraph, and/or a representation of each of the particular grammatical relationships with each sentence. In various exemplary embodiments, the structure of the document is preserved by maintaining an index for each level of the document. By searching the various levels of an indexed document, it is possible, in various exemplary embodiments of the systems and methods according to this invention, to return accurate results based not only on the vocabulary, but also on the grammatical and/or structural relationships between the various words.

Various exemplary embodiments of the systems and methods according to this invention use binary bit vectors to index and/or to search both the vocabulary and grammar of a particular string. In various exemplary embodiments of the systems and methods according to this invention, a particular string is broken down into small units that represent one or more elements of the vocabulary and a relationship or quality of those one or more elements according to the grammar. Then, these units are broken down into their respective elements. An element is one or more words according to the vocabulary or one or more relationships according to the grammar.

Then, in various exemplary embodiments, each element is represented by a bit vector. The bit vectors for the elements are then unioned for each grouped unit, i.e., the various bit vectors for the elements of a particular grouped unit are unioned resulting in a bit vector for each grouped unit. The process continues, such that the bit vector for each sentence is determined by unioning the bit vectors of each grouped unit within that sentence, the bit vectors for each paragraph is determined by unioning the bit vectors of each sentence within that paragraph, and the bit vectors for the document is determined by unioning the bit vectors of each paragraph within that document.

In the various exemplary embodiments of systems and methods according to this invention, when a corpus of documents is searched, the documents are searched in a top down manner. First, the search string is translated into a bit vector, in the same manner as an indexed document is translated into a bit vector. Then, the search string bit vector is intersected with the document bit vector for each document of the corpus. When the intersection of a document bit vector and the search string bit vector equals the search string bit vector, the document is a match. The paragraphs of that document can then be searched in the same manner, i.e., the search string bit vector is intersected with the paragraph bit vector for each paragraph of that document. When the intersection of a paragraph bit vector and the search string bit vector equals the search string bit vector, that paragraph is a match. The sentences of that paragraph can then be searched. In the various exemplary embodiments of the systems and methods according to this invention, the bit vector is used to search a corpus of documents as a single search that loops through each document in a top down fashion. The search proceeds to a component level of a string (the document) only if the previous level was determined to be a match.

These and other features and advantages of various exemplary embodiments of systems and methods according to this invention are described in, or are apparent from, the following detailed description of various exemplary embodiments of the systems and methods according to this invention.

BRIEF DESCRIPTION OF THE DRAWINGS

Various exemplary embodiments of systems and methods according to this invention will be described in detail, with reference to the following figures, wherein:

FIGS. 3–4 show an exemplary representation of some of the grouped units of the first sentence of the exemplary document;

FIG. 5 shows an exemplary representation of some of the grouped units of the second sentence of the exemplary document;

FIGS. 6–7 show an exemplary representation of some of the grouped units of the third sentence of the exemplary document;

FIG. 8 shows an exemplary representation of some of the grouped units of the fourth sentence of the exemplary document;

FIGS. 9–14 show the elements of the exemplary document;

FIG. 15 shows a table containing the various bit indices and associations for the exemplary document;

FIG. 16 shows a table containing the various bit indices and associations for the paragraph of the exemplary document;

FIG. 17 shows a table containing the various bit indices and associations for the first sentence of the exemplary document;

FIG. 18 shows a table containing the various bit indices and associations for the second sentence of the exemplary document;

FIG. 19 shows a table containing the various bit indices and associations for the third sentence of the exemplary document;

FIG. 20 shows a table containing the various bit indices and associations for the fourth sentence of the exemplary document;

DETAILED DESCRIPTION OF EXEMPLARY EMBODIMENTS

Figure 1:
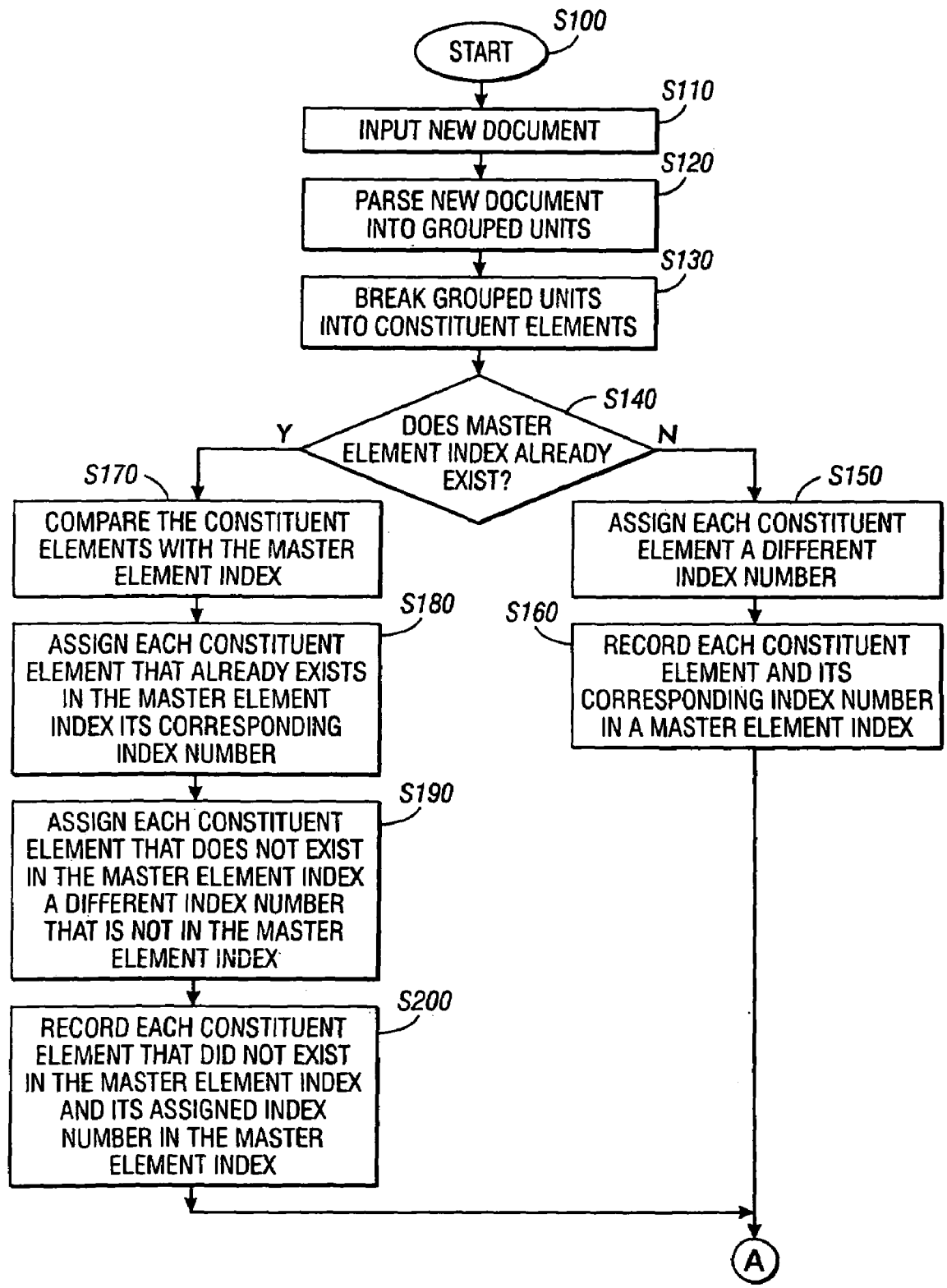
FIGS. 1 and 2 are a flowchart outlining one exemplary embodiment of a method for indexing an exemplary document according to this invention.
Figure 2:
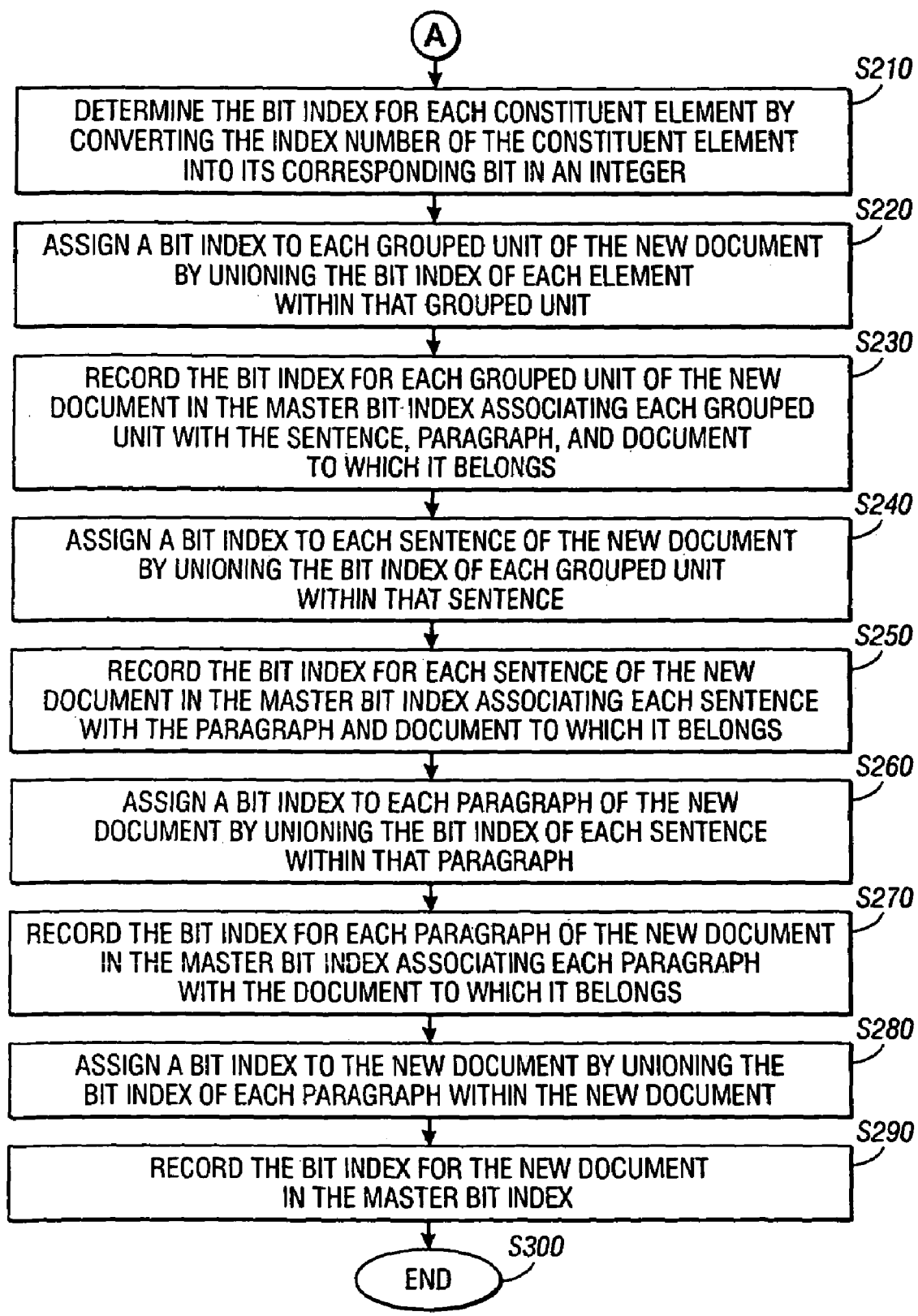

FIG. 1 is a flowchart outlining one exemplary embodiment of a method for storing and indexing each level of the inner structure of a document or other text string or other type of string over a language having a vocabulary and a grammar according to this invention. For ease of explanation, in this exemplary embodiment, the string is a document containing text. In general, in the following description, these strings will be referred to as "documents," even though the strings need not be documents. As shown in FIG. 1, operation of the method begins in step S100 and continues to step S110, where a new document is input. For the purposes of explanation, assume the new document contains the following paragraph:

"Showers continued throughout the week in the Bahia cocoa zone, alleviating the drought since early January and improving prospects for the coming temporao, although normal humidity levels have not been restored, Commissary Smith said in its weekly review. The dry period means the temporao will be late this year. Arrivals for the week ended February 22 were 155,221 bags of 60 kilos making a cumulative total for the season of 5.93 mln against 5.81 at the same stage last year. Again it seems that cocoa delivered earlier on consignment was included in the arrivals figures."

Then, in step S120, the new document is parsed into grouped units. A grouped unit includes at least one word and/or number and at least one grammatical or textual relationship or quality of the word(s) and/or number(s) of the grouped unit within the language of the string. FIGS. 3–8 show a representative listing of some of the grouped units contained in each sentence of the exemplary document. For instance, for the phrase "weekly review," in row L6 of FIG. 3, the grouped unit "MOD (review, weekly)" defines a modifying relationship in this language, (represented by "MOD"), between the words "review" and "weekly," where "weekly"is a modifying adjective for the noun "review." Similarly, for the phrase "Commissary Smith said," in row L21 of FIG. 3, "SUBJ (said, Smith)" represents the grammatical relationship in this language between the words "Smith" and "said", where, in this language, "Smith" is the subject (represented by SUBJ) of the verb "said."

After the document has been parsed into grouped units, operation continues to step S130, where each grouped unit is broken into its constituent elements. Referring to FIGS. 3–8, each grouped unit includes at least one word and/or number and the at least one grammatical or textual relationship or quality of those word(s) and/or number(s) in the language. Each word or number in a particular grouped unit is represented by an element of the group. Likewise, the at least one grammatical or textual relationship or quality is represented by an element of the group. FIGS. 9–14 are a table of the various elements that make up the exemplary new document. Operation then continues to step S140.

In step S140, a determination is made whether a master element index exists. If the exemplary new document is the first document to be stored and indexed of a corpus of documents to be analyzed using the same index, then a master element index containing elements from previously-analyzed documents may not exist. If the master element index does not already exist, operation continues to step S150. Otherwise, operation jumps to step S170.

In step S150, each constituent element is assigned a different index number. In various exemplary embodiments, the index numbers are integers consecutively assigned to each element in the order in which that element appears in the new document. As shown in FIGS. 9–14, each element has been assigned an index number from 0 to 224. Then, in step S160, each constituent element and its corresponding index number are recorded in the master element index. The table in FIGS. 9–14 represent one example of a master element index. However, it should be appreciated that the master element index can take any appropriate form. Operation then jumps to step S210.

In contrast, in step S170, the constituent elements of the new document are compared with the elements in the already-existing master element index. Then, in step S180, each constituent element of the new document that already exists in the master element index is assigned its corresponding index number from the master element index. Next, in step S190, each constituent element that does not already exist in the master element index is assigned a different index number that is not already in the master element index. In various exemplary embodiments, the new index numbers are also integers (generally, these will be consecutively assigned) assigned to each constituent element that does not already exist in the master element index, beginning with the smallest integer not already in the master element index. Operation then continues to step S200.

In step S200, each constituent element that did not already exist in the master element index and its corresponding new index number are recorded in the master element index.

Next, in step S210, the bit index for each constituent element is determined by setting a bit in a bit string at a location in the bit string corresponding to the index number of that constituent element. For ease of explanation, the exemplary embodiment will be described using bit strings that are 16 bits long, i.e., where each bit string can each represent up to 16 constituent elements. However, it should be appreciated that much larger bit strings may be used. Therefore, in this exemplary embodiment, the element "improve" in row L1046 of FIG. 10 would have a bit index in which the 14th bit of the third 16-bit bit string would be set to 1.

Essentially, the bit index for an element is determined by dividing that element's index number, plus 1, by n, (where n is the number of bits in each bit string), to obtain both the number of the particular n-bit bit string and the particular bit position in that bit string that is to be set to 1 for this element. In various exemplary embodiments, the bit string number is determined as "Int ((i+1)/n)+1." The bit position is, in various exemplary embodiments, determined as $Mod_n (i+1)$, where i is that element's index number, and n is the number of bits in each bit string. In the case of "improve", which is the 46th element and which has an index number of "45", Int ((45+1)/16)+1, i.e., (45+1) divided by 16, plus 1, equals 3, while $Mod_{16} (45+1)$ returns a value of 14. Therefore, the first two bit strings are completely filled with zeros and the 14th bit of the third bit string is set to 1. Note that it is necessary to add 1 to the index number because the index numbers begin with zero. If the index numbers instead began with 1, it would not be necessary to add 1 to i in these functions.

In this exemplary embodiment, and as discussed later with reference to FIGS. 15–20, the various 16-bit bit-strings are referred to by their rank. In various exemplary embodiments, the first bit string has a rank of 0, the second bit string has a rank of 1, the third bit string has a rank of 2, and so on. Therefore, for 16-bit-strings, the element "improve" is indexed by the 14th bit of the bit string with a rank of 2, i.e., Int ((i+1)/n), where i is that element's index number, and n is the number of bits in each bit string. Similarly, the element "mean" in row L1160 of FIG. 12 is stored in the 15th bit of the bit string ranked 9. Operation then continues to step S220.

In step S220, for each grouped unit, a bit index value is assigned to that grouped unit of the exemplary new document by unioning the bit index of each element within that grouped unit. For example, referring to FIG. 3, the grouped unit "MOD (zone, Bahia)", in row L7 is represented by a bit index that is the union of the bit indices for the elements "MOD," "zone," and "Bahia." Therefore, the bit index for the element "MOD (zone, Bahia)" would be the union of the first bit of the 0-ranked bit string and the fifth and sixth bits of the 3-rank bit string. Next, in step S230, the bit index for each grouped unit is recorded in a master bit index, associating each grouped unit with the sentence, paragraph, and document to which it belongs. Then, in step S240, a bit index is assigned to each sentence of the new document by unioning the bit index of each grouped unit within that sentence. Next, in step S250, the bit index for each sentence of the new document is recorded in the master bit index, associating each sentence with the paragraph and document to which it belongs. Operation then continues to step S260.

In step S260, a bit index is assigned to each paragraph of the new document by unioning the bit indices of each sentence within that paragraph. Then, in step S270, the bit index for each paragraph of the new document is recorded in the master index, associating each paragraph with the document to which it belongs. Next, in step S280, a bit index is assigned to the new document by unioning the bit indices of each paragraph within that new document. Then, in step S290, the bit index for the new document is recorded in the master bit index. Operation then continues to step S300, where the operation of the method ends.

FIGS. 15–20 show a number of tables representing the bit indices for each sentence of the exemplary new document, the paragraph forming the exemplary new document, and the whole of the exemplary new document. It should be noted that because the exemplary document contains only one paragraph, the document index and the paragraph index for the exemplary new document are identical. Furthermore, because, for this exemplary embodiment, the new exemplary document is the only document that has been indexed, both the document index and paragraph index contain every element in the index. Therefore every bit of the first 14 bit-strings is set to 1 and the first bit of the $15^{th}$ bit string (rank 14) is set to 1, as the entire index contains 225 elements ((16×14)+1).

As shown in FIGS. 15–20, the various bit indices for each document, paragraph and sentence contain an ID file column indicating to which file or document the paragraph or sentence belongs; an ID paragraph column, indicating to which paragraph the sentence belongs; an ID sentence column, indicating the number of the sentence; a rank column, indicating the rank of the bit-string in the bit index for each limit; and a value column, indicating the decimal value described by the binary representation of each bit-string. For the purpose of clarity, a binary column has been added to FIGS. 15–20 to show the binary data of each bit-string.

However, in various exemplary embodiments, the binary data itself is not stored. Rather, only the decimal value of the binary bit string is recorded. For illustrative purposes, note that the first sentence is indexed over ten bit strings, ranks 0 to 9. Each bit in the first nine 16-bit bit-strings is set to 1. Therefore, the decimal value for each of those 16-bit bit-strings is 65,535 ($2^{16}-1$). The tenth 16-bit bit-string, i.e., the 9-rank bit-strong, has only the first three bits set to 1 and its corresponding decimal value is 7 ($2^3-1$). As can be inferred from the first sentence's bit index, the first sentence contains the first 146 elements of the exemplary new document. The first nine 16-bit bit-strings represent the elements with index numbers 0 to 143 ((16×9)−1), while the tenth 16-bit bit-string represents the elements with index numbers 144, 145, and 146.

Similarly, the second sentence contains elements in the first eleven 16-bit bit-strings of the master bit index. As can be inferred from FIGS. 17 and 18, the second sentence shares a fair amount of its elements with the first sentence, as many of the bits in the first ten 16-bit bit-strings are set to 1. However, it does not contain every element, as many of the bits in the first ten 16-bit bit-strings are set to "0." Furthermore, the second sentence contains new elements having index numbers 147 to 161. These elements are stored within the fourth through 16th bits of the 9-rank bit-string and the first two bits of the 10-rank bit-string. The bit indices for the third and fourth sentences are similarly constructed. It should be appreciated that the table shown in FIG. 20, representing the fourth sentence of the exemplary document, does not include a row for the 10th ranked bit-string because none of the elements indexed in the 10th ranked bit string are present in the fourth sentence.

Figure 21:
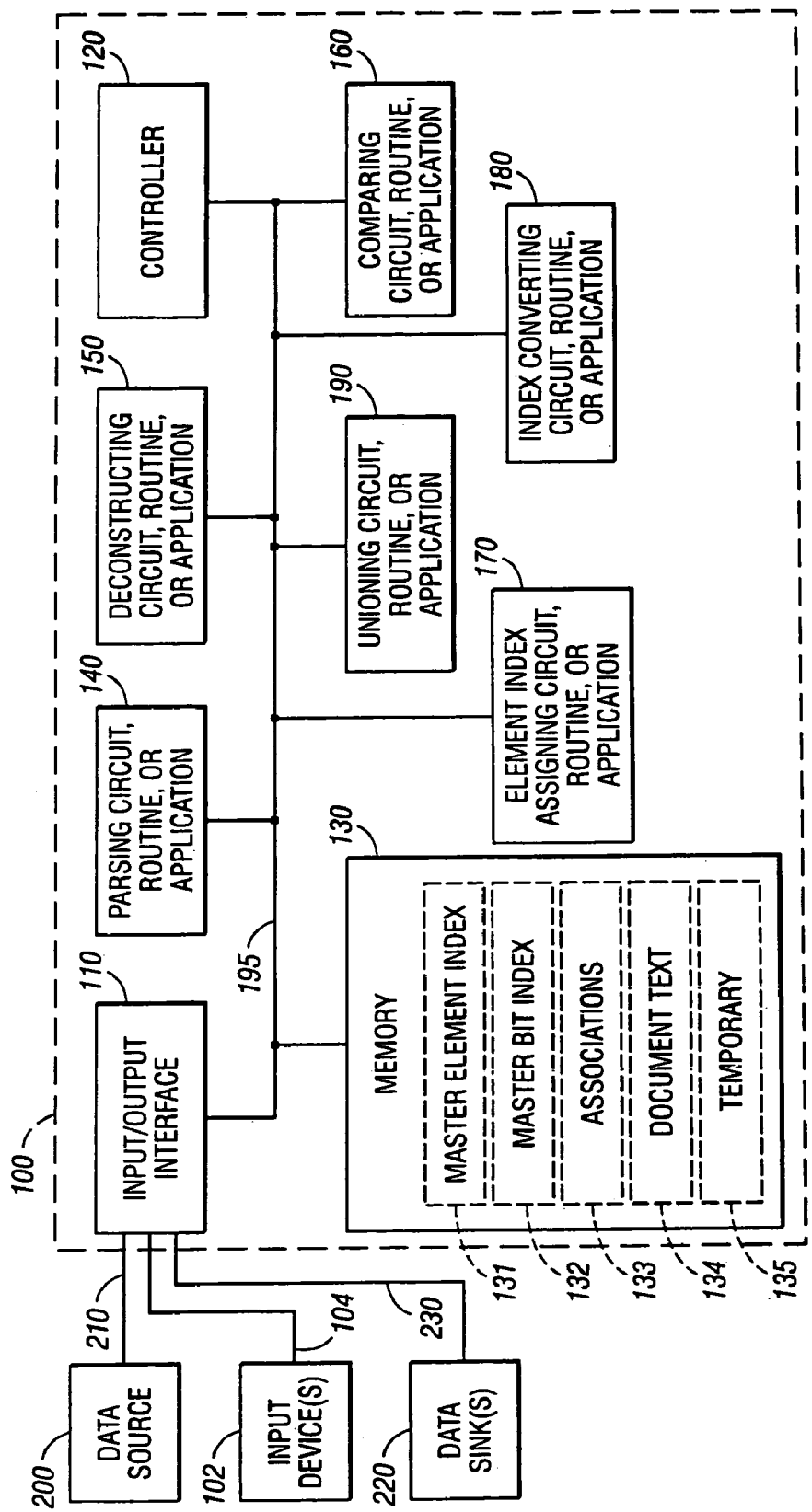
FIG. 21 is a block diagram outlining one exemplary embodiment of a string indexing system according to this invention.
Figure 22:
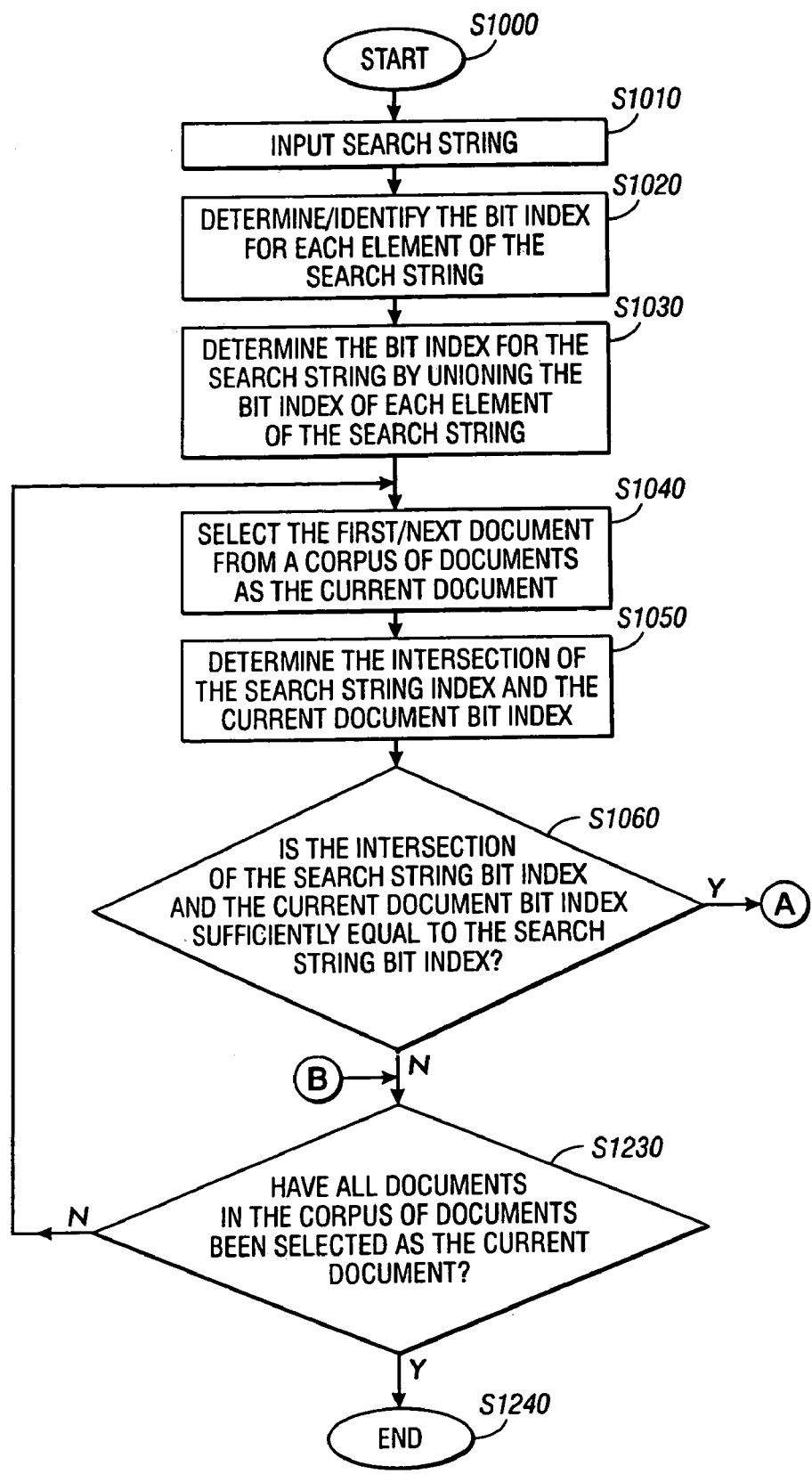
FIGS. 22–25 are a flowchart outlining an exemplary embodiment of a method for searching indexed documents according to this invention.
Figure 23:
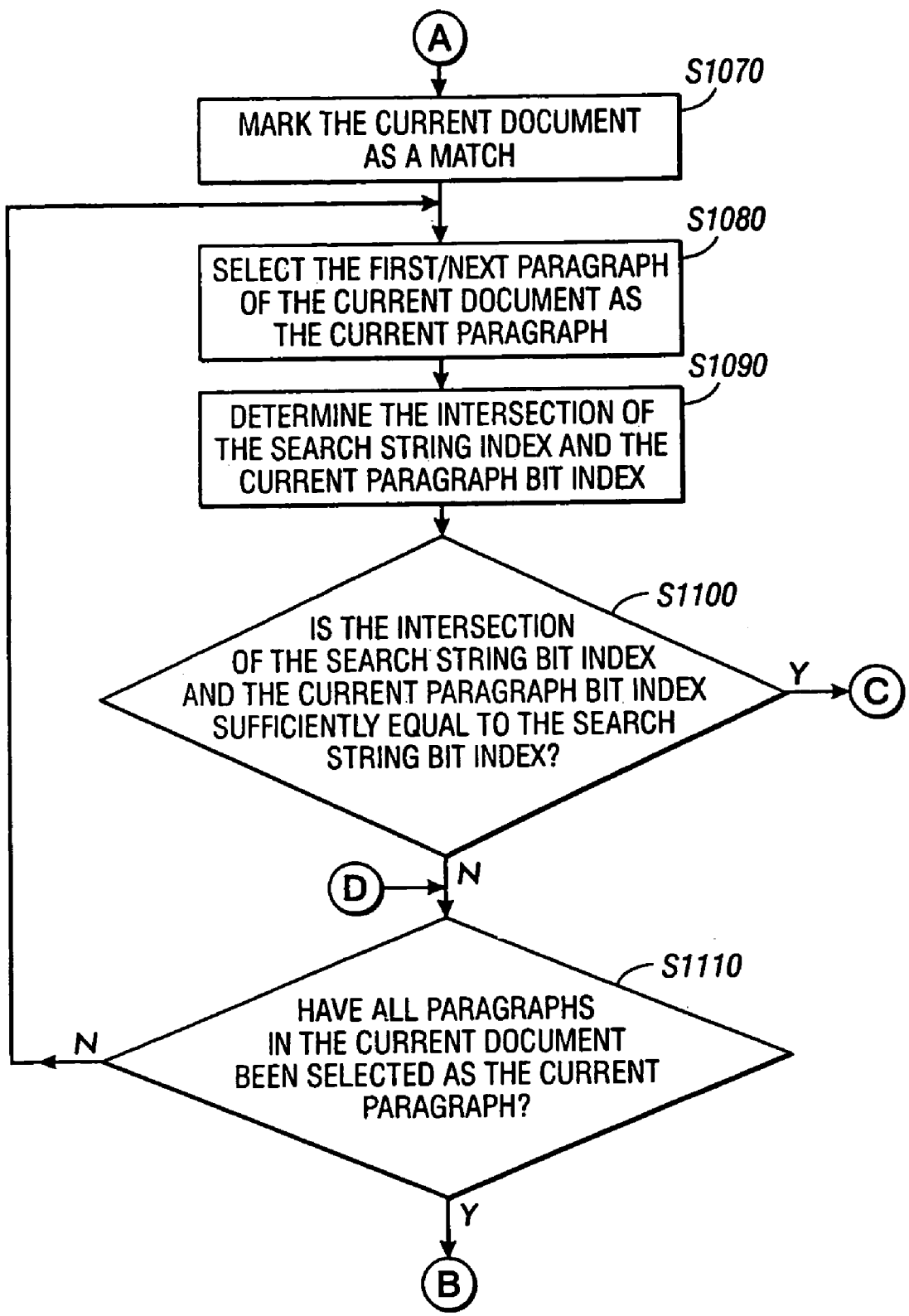
Figure 24:
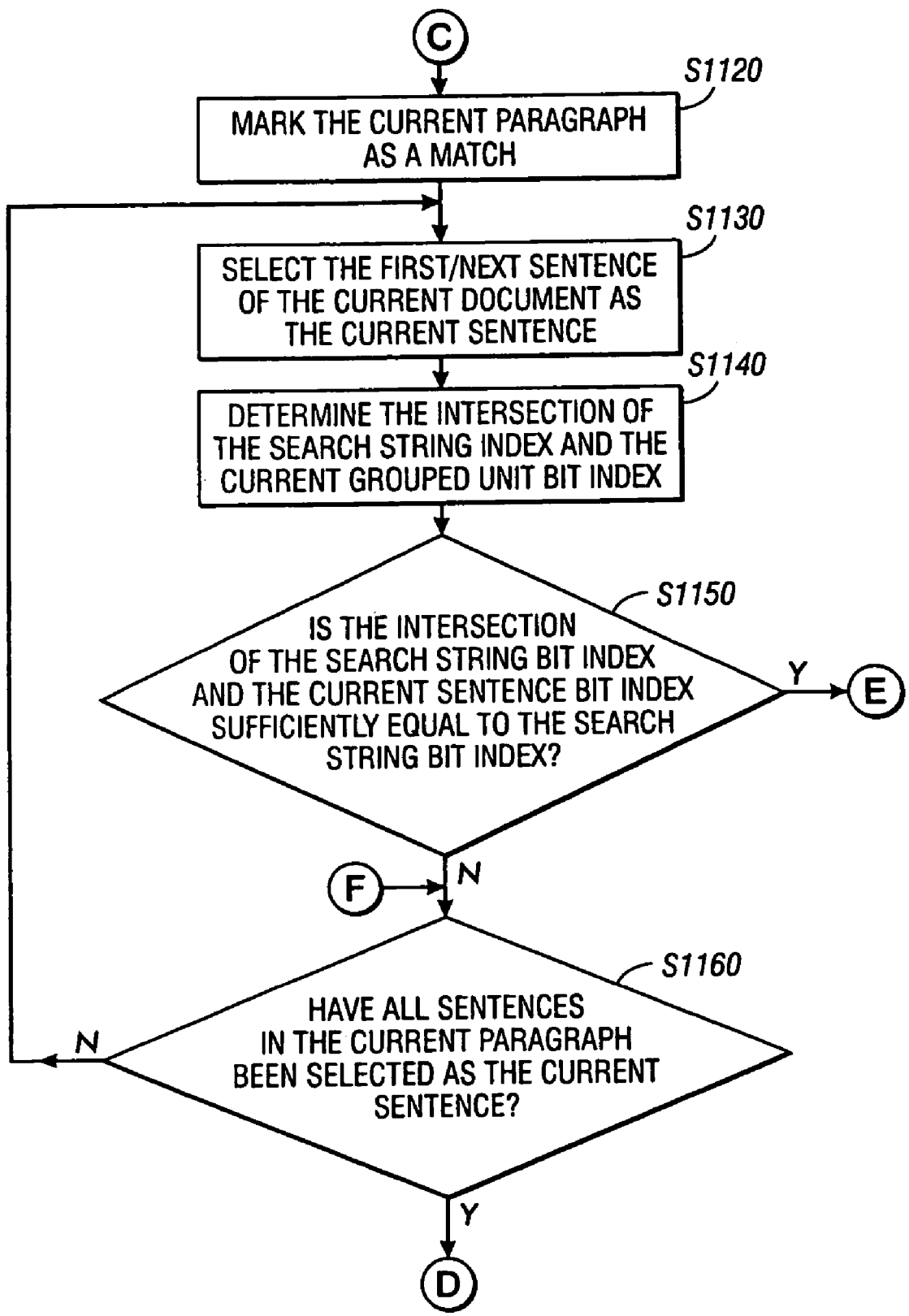
Figure 25:
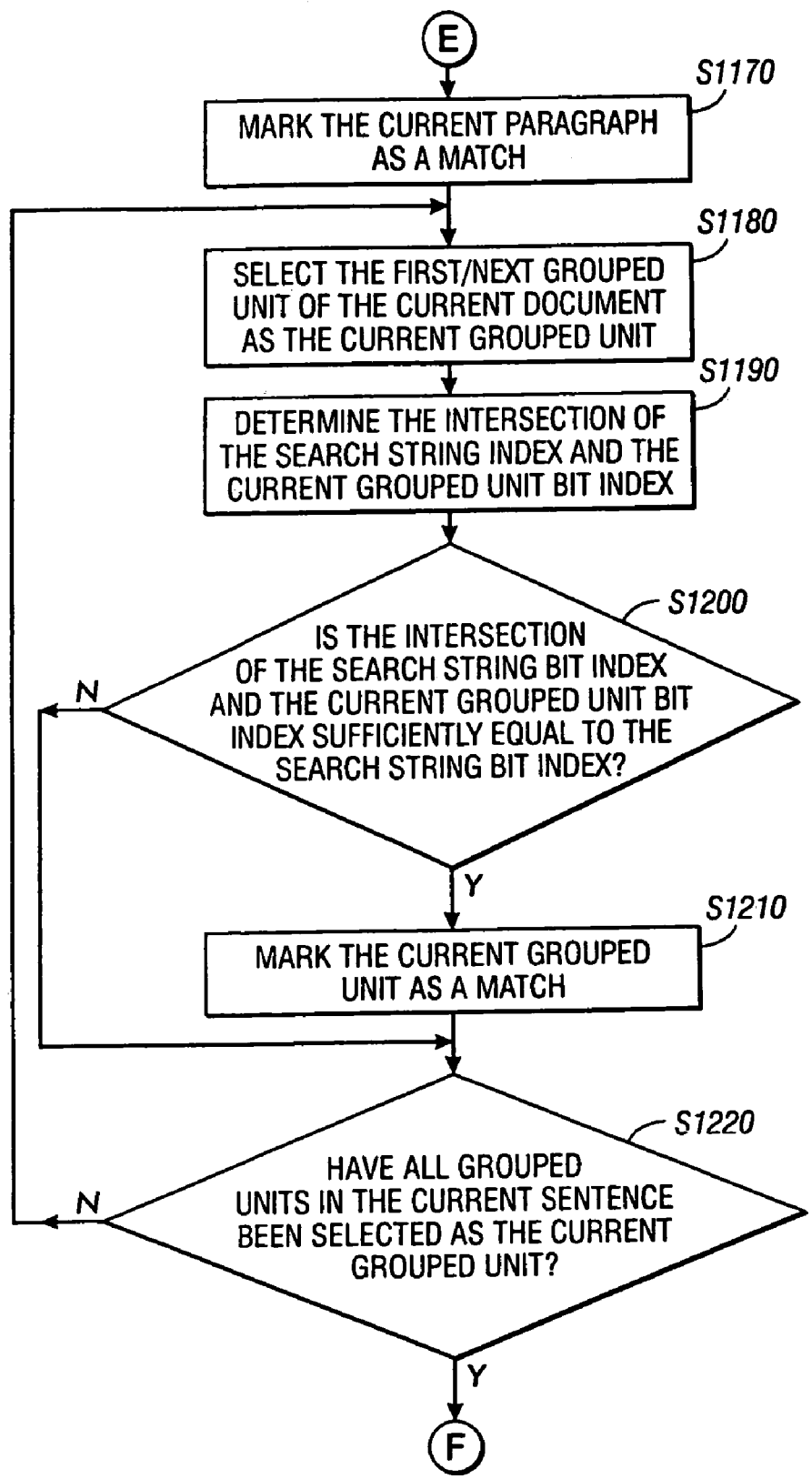

FIG. 21 is an exemplary embodiment of a functional block diagram of one exemplary embodiment of a string indexing system 100 that is usable to index a string over a language having a grammar according to the invention. As shown in FIG. 21, the string indexing system 100 includes an input/output interface 110, a controller 120, a memory 130, a parsing circuit, routine, or application 140, a deconstructing circuit, routine, or application 150, a comparing circuit, routine, or application 160, an element index assigning circuit, routine, or application 170, an index converting circuit, routine, or application 180, and a unioning circuit, routine, or application 190, each appropriately interconnected by one or more data/control busses and/or application programming interfaces 195 or the like.

In this exemplary embodiment, the input/output interface 110 is connected to a data source 200 over a link 210. The data source 200 can be a locally or remotely located laptop or personal computer, a personal digital assistant, a tablet computer, a device that stores and/or transmits electronic data, such as a client or a server of a wired or wireless network, such as for example, an intranet, an extranet, a local area network, a wide area network, a storage area network, the Internet (especially the World Wide Web), and the like. In general, the data source 200 can be any known or later-developed source that is capable of providing string data to the input/output interface 110.

In this exemplary embodiment, the input/output interface 110 is connected to one or more input devices 102 over one or more links 104. The input device(s) 102 can be one or more of a keyboard, a mouse, a track ball, a track pad, a touch screen, or any other known or later-developed device for inputting data and/or control signals to the string indexing system 100. In this exemplary embodiment, the input/output interface 110 is connected to one or more data sinks 220 over one or more links 230. The data sink(s) 220 can be a locally or remotely located laptop or personal computer, a personal digital assistant, a tablet computer, a device that receives and stores, and/or transmits electronic data, such as for example, a client or a server of a wired or wireless network, an intranet, an extranet, a local area network, a wide area network, a storage area network, the Internet (especially the World Wide Web), and the like. In general, the data sink(s) 220 can be any device that is capable of receiving and transmitting and/or storing the indexed string data that is provided by the one or more links 230.

Each of the various links 104, 210, and 230 can be any known or later-developed device or system for connecting the input device(s) 102, the data source 200 and/or the data sink(s) 220, respectively, to the input/output interface 110. In particular, the links 104, 210, and 230 can each be implemented as one or more of a direct cable connection, a connection over a wide area network, a local area network or a storage area network, a connection over an intranet, a connection over an extranet, a connection over the Internet, a connection over any other distributed processing network or system, and/or an infrared, radio-frequency or other wireless connection.

As shown in FIG. 21, the memory 130 contains a number of different memory portions, including a master element index portion 131, a master bit index portion 132, an associations portion 133, a document text portion 134, and a temporary portion 135. The master element index portion 131 of the memory 130 stores the master element index. The master bit index portion 132 of the memory 130 stores the master bit index. The associations portion 133 of the memory 130 stores the associations between elements, grouped units, sentences, paragraphs, and documents. The document text portion 134 of the memory 130 stores the text of each document that has been indexed. Finally, the temporary portion 135 temporarily saves various data necessary for the operation of the string indexing system 100.

The memory 130 shown in FIG. 21 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like The parsing circuit, routine, or application 140 inputs a document or other string and outputs that document's or string's grouped units. The deconstructing circuit, routine, or application 150 inputs one or more grouped units and breaks each such grouped unit into its constituent elements. The comparing circuit, routine, or application 160 inputs an element or a group of elements and determines whether each element of that group is present on the master element index. The element index assigning circuit, routine, or application 170 inputs an element or a group of elements that has been determined by the comparing circuit, routine or application 160 not to be present on the master element index and assigns each such element an index number on the appropriate index, respectively. The index converting circuit, routine, or application 180 inputs an element index or group of element indices and converts each element index into its corresponding bit in a bit-string, i.e., its bit index. Finally, the unioning circuit, routine, or application 190 inputs two or more bit indices and outputs a bit index representing the union of the input bit indices.

In operation, the exemplary embodiment of the string indexing system 100 shown in FIG. 21 operates by inputting a new document from the data source 200 across the link 210 via the input/output interface 110 as a current document. Again, for ease of explanation, for this exemplary embodiment, the string over a language having a vocabulary and a grammar is a document containing text. Under control of the controller 120, the current document is stored in the document text portion 134 of the memory 130. Then, under control of the controller 120, the current document is input by the parsing circuit, routine, or application 140. The parsing circuit, routine, or application 140 parses the current document into its grouped units. Under control of the controller 120, the parsing circuit, routine or application 140 outputs the grouped units to the temporary portion 135 of the memory 130 and data representing the sentence, paragraph and document to which each element belongs to the associations portion 133 of the memory 130. Next, under control of the controller 120, the deconstructing circuit, routine, or application 150 inputs the grouped units, either directly from the parsing circuit, routine, or application 140 or from the temporary portion 135 of the memory 130. The deconstructing circuit, routine, or application 150 breaks down the grouped units into elements. Under control of the controller 120, the deconstructing circuit, routine or application 150 outputs the elements to the temporary portion 135 of the memory 130 and/or to the comparing circuit, routine or application 160.

The controller 120 next determines whether the master element index that is to be used with or for this document already exists. If such a master element index already exists, the comparing circuit, routine or application 160, under control of the controller 120, inputs the existing master element index from the master element index portion 131. Then, under control of the controller 120, the comparing circuit, routine, or application 160 inputs the elements stored in the temporary portion 135 of the memory 130.

The comparing circuit, routine, or application 160 compares the elements in the input master element index with the elements input from the temporary portion 135 of the memory 130. Under control of the controller 120, the elements that were stored in the temporary portion 135 of the memory 130 that do not match any elements in the master element index portion 131 of the memory 130 are output by the comparing circuit, routine, or application 160, either directly or indirectly, to the element index assigning circuit, routine, or application 170. The element index assigning circuit, routine, or application 170 assigns each such element a different element index number that is not already in the master element index portion 131 of the memory 130. Under control of the controller 120, the element index assigning circuit, routine, or application 170 adds the elements and the element index numbers to the master element index stored on the master element index portion 131 of the memory 130.

However, if a master element index does not exist, because, for example, no data has yet been stored in the master element index portion 131 of the memory 130, under control of the controller 120, the element index assigning circuit, routine, or application 170, under control of the controller 120, inputs every element stored in the temporary portion 135 of the memory 130. The element index assigning circuit, routine, or application 170 again assigns each element a different index number, and, under control of the controller 120, creates a master element index, stores it into the master element index portion 131 and adds the elements and index numbers to the master element index stored in the master element index portion 131 of the memory 130.

Next the index converting circuit, routine, or application 180, under control of the controller 120, inputs the elements of the current document and their respective index numbers. The index converting circuit, routine, or application 180 converts the index number of each element into a corresponding bit in a bit string, i.e., its bit index. The corresponding bit index, described in various exemplary embodiments by a rank and a location in a bit-string that corresponds to the index number, as shown in FIG. 21, is output by the index converting circuit, routine or application 180, under control of the controller 120, to the master bit index portion 132 of the memory 130, and/or to the unioning circuit, routine or application 190.

Then, under control of the controller 120, the unioning circuit, routine or application 190 inputs the elements of the current document and their respective bit indices from the master bit index portion 132 of the memory 130 and the associations data from the associations portion of the memory 130. The unioning circuit, routine, or application 190 assigns a bit index to each grouped unit of the new document by unioning the bit indices of all of the elements within that grouped unit according to the associations data. Then, under control of the controller 120, the unioning circuit, routine or application 190 outputs the bit index for each grouped unit to the master bit index portion 132 of the memory 130 and outputs cross-references for the bit indices for those grouped units to their associated sentence, paragraph, and document information stored in the associations portion 133 of the memory 130.

Subsequently, under control of the controller 120, the unioning circuit, routine or application 190 inputs the bit indices of the grouped units for a selected sentence from the master bit index portion 132 of the memory 130 and the association data from the associations portion 133 of the memory 130. For each selected sentence, the unioning circuit, routine, or application 190 then assigns a bit index to the selected sentence of the current document by unioning the bit indices of the grouped units contained in that sentence according to the associations data. Under control of the controller 120, the unioning circuit, routine or application 190 outputs the index for each sentence of the current document to the master bit index portion 132 of the memory 130, and outputs cross-references for the bit indices of the sentences to their associated paragraphs and documents to the associations portion 133 of the memory 130.

Next, under control of the controller 120, the unioning circuit, routine or application 190 inputs the master bit index of each sentence for a selected paragraph of the current document from the master bit index 132 of the memory 130 and of the association data from the associations portion 133 of the memory 130. For each selected paragraph, the unioning circuit, routine, or application 190 then assigns a bit index to the selected paragraph of the current document by unioning the bit indices of all of the sentences within that paragraph according to the association data. Then, under control of the controller 120, the unioning circuit, routine or application 190 outputs the master bit index for each paragraph of the current document to the master bit index portion 132 of the memory 130 and outputs cross references for each paragraph to the document to which it belongs to the associations portion 133 of the memory 130.

Finally, under control of the controller 120, the unioning circuit, routine or application 190 inputs the bit indices for all of the paragraphs stored in the master bit index portion 132 of the memory 130 and the association data stored in the associations portion 133 of the memory 130. The unioning circuit, routine, or application 190 next assigns a bit index to the current document by unioning the indices of all of the paragraphs in the current document according to the associations data. Then, under control of the controller 120 the unioning circuit, routine or application 190 outputs the index of the current document to the master bit index portion 132 of the memory 130.

As a result of the above-described operations of the exemplary embodiment of the string indexing system 100 shown in FIG. 21, the master bit index portion 132 of the memory 130 contains a complete bit index of the current document. The complete bit index contains each element and its respective bit index properly associated with the grouped unit(s) to which it belongs, the sentence(s) to which it belongs, the paragraph(s) to which it belongs, and the document(s) to which it belongs. Similarly, the master bit index contains the bit index for each sentence of the current document, properly associated with the paragraph(s) to which it belongs and the document(s) to which it belongs. The master bit index also contains the bit index for each paragraph of the current document, properly associated with that document. Finally, a master bit index portion 132 of the memory 130 contains the bit index for the current document.

It should be appreciated that, depending on cost or other design constraints, one or more of the above-described elements of the string indexing system 100 may be combined into a single element or divided into multiple elements where appropriate.

FIGS. 22–25 describe a flowchart outlining one exemplary embodiment of a method for searching a corpus of at least one string, such as at least one document, according to this invention. As shown in FIGS. 22–25, operation of the method begins in step S1000 and continues to step S1010, where a search string is input. The search string may include search terms, natural language, search terms linked by Boolean operators, specific field queries, or any other known or later-developed search technique, operator, element or the like that may be broken down into elements of a particular language having a vocabulary and a grammar and/or relationships between the words according to the grammar of the language.

Then, in step S1020, the bit index for each element in the search string is determined or identified. The elements of the search string may be determined in a number of ways, depending upon the type of search string. For example, if the search string includes natural language elements, the search string will be parsed into its grouped units and the grouped units broken into the constituent elements in the same manner, as outlined above, that documents are indexed. Alternatively, if a Boolean search string is used, the elements will simply be the words of the language contained in the Boolean search string. In various exemplary embodiments of step S1020, the master bit index is searched for each element of the search string. When an element of the search string is located in the master bit index, that element of the search string will be assigned the corresponding bit index from the master bit index. However, if the element does not exist in the master bit index, it will be assigned a unique bit index not contained in the master bit index. In various exemplary embodiments, the assigned bit index will be the next consecutive bit that is not already part of the index set to one. For example, assuming that FIGS. 9–14 represented the total bit index, the next element of the search string to be indexed that did not already exist in the index would be the $225^{th}$ element and would be represented by the second bit of the $14^{th}$ ranked integer set being set to 1.

Next in step S1030, the bit index for the search string as a whole is determined by unioning the bit index of each element of the search string. It should be noted that, if a Boolean search string containing the operator "OR" is input, more than one bit index will be created containing the alternative element combinations. Operation then continues to step S1040.

In step S1040, a first or next document is selected from a corpus of documents as the current document. Then, in step S1050, the intersection of the search string bit index and the current document bit index is determined. Next, in step S1060, a determination is made whether the intersection of the search string bit index and the current document bit index is sufficiently equal to the search string bit index. If the intersection of the search string bit index and the current document bit index is sufficiently equal to the search string bit index, the current document contains each element of the search string. Accordingly, operation continues to step S1070. If the intersection of the search string bit index and the current document bit index is not sufficiently equal to the search string bit index, the current document does not contain each element of the search string and operation jumps to step S1230.

In step S1070, the document is marked as a match. Then, in step S1080, the first/next paragraph of the current document is selected as the current paragraph. Next, in step S1090, the intersection of the search string bit index and the current paragraph bit index is determined. Then, in step S1100, a determination is made whether the intersection of the search string bit index and the current paragraph bit index is sufficiently equal to the search string bit index. If the intersection of the search string bit index and the current paragraph bit index is sufficiently equal to the search string bit index, the paragraph contains all of the elements of the search string. Therefore, operation jumps to step S1120. However, if the intersection of the search string bit index and the paragraph bit index is not sufficiently equal to the search string bit index, the paragraph does not contain all of the elements of the search string and operation continues to step S1110.

In step S1110, a determination is made whether all paragraphs of the current document have been selected as the current paragraph. If every paragraph of the current document has not been selected as the current paragraph, operation returns to step S1080 where the next paragraph is selected as the current paragraph. If every paragraph of the current document has been selected as the current paragraph, operation again jumps to step S1230.

In step S1120, the current paragraph is marked as a match. Then, in step S1130, the first/next sentence of the current paragraph is selected as the current sentence. Next, in step S1140, the intersection of the search string bit index and the current sentence bit index is determined. Then, in step S1150, a determination is made whether the intersection of the search string bit index and the current sentence bit index is sufficiently equal to the search string bit index. If the intersection of the search string bit index and the current sentence bit index is sufficiently equal to the search string bit index, the sentence contains all of the elements of the search string. Therefore, operation jumps to step S1170. However, if the intersection of the search string bit index and the sentence bit index is not sufficiently equal to the search string bit index, the sentence does not contain all of the elements of the search string and operation continues to step S1160.

In step S1160, a determination is made whether all sentences of the current paragraph have been selected as the current sentence. If every sentence of the current paragraph has not been selected as the current sentence, operation returns to step S1080 where the next sentence is selected as the current sentence. If every sentence of the current paragraph has been selected as the current sentence, operation returns to step S1110, where the determination is made again whether every paragraph in the current document has been selected as the current paragraph.

In step S1170, the current sentence is marked as a match. Then, in step S1180, the first/next grouped unit of the current sentence is selected as the current grouped unit. Next, in step S1190, the intersection of the search string bit index and the current grouped unit bit index is determined. Then, in step S1200, a determination is made whether the intersection of the search string bit index and the current grouped unit bit index is sufficiently equal to the search string bit index. If the intersection of the search string bit index and the current grouped unit bit index is sufficiently equal to the search string bit index, the grouped unit contains all of the elements of the search string. Therefore, operation continues to step S1210. However, if the intersection of the search string bit index and the grouped unit bit index is not sufficiently equal to the search string bit index, the current grouped unit does not contain all of the elements of the search string and operation jumps to step S1220.

In step S1210, the current grouped unit is marked as a match. Then, in step S1220, a determination is made whether every grouped unit in the current sentence has been selected as the current grouped unit. If every grouped unit in the current sentence has not been selected as the current grouped unit, operation returns to step S1180, where the next grouped unit of the current sentence is selected as the current grouped unit. However, if every grouped unit in the current sentence has been selected as the current grouped unit, operation returns to step S1160, where the determination is made again whether every sentence in the current paragraph has been selected as the current sentence.

In step S1230, a determination is made whether every document in the corpus of documents has been selected as the current document. If every document has not been selected as the current document, operation returns to step S1040, where the next document is selected as the current document. If every document has been selected as the current document, operation jumps to step S1240, where the method ends.

Again, it should be noted that, when the input search string contains the Boolean operator "OR," or its equivalent the various search strings representing each alternative group of elements will be searched independently of one another. Once each alternative search string has been searched, the results will be unioned, representing the cumulative results of the entire Boolean search string.

Figure 26:
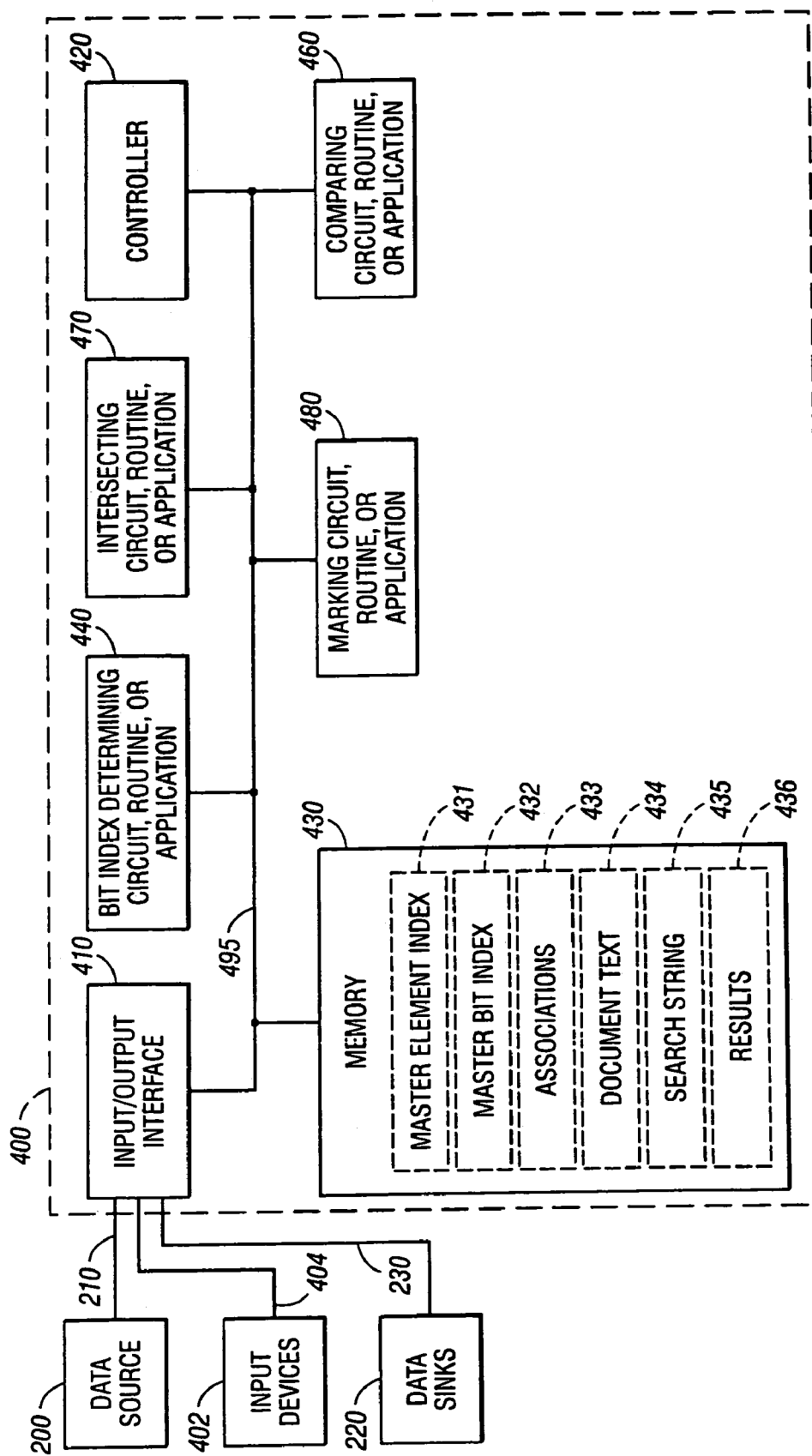
FIG. 26 is a block diagram outlining an exemplary embodiment of a document searching system according to this invention.

FIG. 26 shows an exemplary embodiment of a string searching system 400 usable to search each level of the inner structure a corpus of documents or the like that have been indexed according to this invention. As shown in FIG. 26, the string searching system 400 includes an input/output interface 410, a controller 420, a memory 430, a bit index determining circuit, routine, or application 440, a comparing circuit, routine, or application 460, an intersecting circuit, routine, or application 470, and a marking circuit, routine, or application 480, each appropriately interconnected by one or more data/control busses and/or application programming interfaces 495, or the like. The input/output interface 410 is connected to one or more data sources 500 over a link 510. The data source 500 can be any device suitable for storing and/or transmitting electronic data, such as a client or server of a network, or the Internet, and especially the World Wide Web. The data source 500 can be any known or later-developed data source that is capable of providing indices for a corpus of documents or the like that have been indexed according to this invention to the input/output interface 410 of the string searching system 400 according to this invention.

The input/output interface 410 is connected to one or more input devices 402 over a link 404. The input device(s) 402 can be one or more of a keyboard, a mouse, a track ball, a track pad, a touch screen, or any other known or later-developed device for inputting data and/or control signals to the string searching system 400. Furthermore, in this exemplary embodiment, the input/output interface 410 is connected to a data sink 520 over a link 530. In general, the data sink 520 can be can be a locally or remotely located laptop or personal computer, a personal digital assistant, a tablet computer, a device that receives and stores and/or transmits electronic data, such as for example, a client or a server of a wired or wireless network, an intranet, an extranet, a local area network, a wide area network, a storage area network, the Internet (especially the World Wide Web), and the like. In general, the data sink 520 can be any device that is capable of receiving and transmitting and/or storing the indexed string data that is provided by the one or more links 230.

Each of the various links 404, 510 and 530 can be implemented using any known or later-developed device or system for connecting the data source 500, the data sink 520, and/or the input device(s) 402, respectively, to the input/output interface 410. In particular, the links 404, 510 and 530 can each be implemented as one or more of a direct cable connection, a connection over a wide area network, a local area network, a connection over an intranet, a connection over an extranet, a connection over the Internet, a connection over any other distributed processing network or system, or an infrared, radio-frequency, or other wireless connection.

As shown in FIG. 26, the memory 430 contains a number of different memory portions, including a master element index portion 431, a master bit index portion 432, an associations portion 433, a document text portion 434, a search string portion 435, a number portion 436, and a results portion 437. The master element index portion 431 of the memory 430 stores the master element index. The master bit index portion 432 of the memory 430 stores the master bit index. The associations portion 433 of the memory 430 stores the associations between elements, grouped units, sentences, paragraphs, and/or documents. The document text portion 434 of the memory 430 stores the text of each document or the like that has been indexed. The search string portion 435 stores both the text and bit index of the search string. Finally, the results portion 436 of the memory 430 stores the search results.

The memory 430 shown in FIG. 26 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-re-writeable optical disk and disk drive, a hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like The bit index determining circuit, routine, or application 440 inputs a search string and determines its bit index or indices. The comparing circuit, routine, or application 460 inputs at least two bit indices and determines whether the bit indices are sufficiently equal to one another (or if one bit index is contained entirely within the other bit index). The intersecting circuit, routine, or application 470 inputs two or more bit indices and determines their intersection. Finally, the marking circuit, routine, or application 480 marks a grouped unit, a sentence, a paragraph, and/or a document that has been determined to be a match.

In operation, the string searching system 400 inputs a search string from the one or more input device(s) 402 across the link 404 via the input/output interface 410. Alternatively, the search string may be received from the data source 500 across the link 510 via the input/output interface 410. Under control of the controller 420, the search string is stored in the search string portion 435 of the memory 430. Then, the bit index determining circuit, routine, or application 440, under control of the controller 420, inputs the search string. The bit index determining circuit, routine, or application 440 determines a bit index of the search string. Next, in various exemplary embodiments, under control of the controller 420, the search string bit index is stored in the search string portion 435 of the memory 430.

After the search string bit index has been determined, the search string is input, under control of the controller 420, either from the search string portion 435 of the memory 430, or directly from the bit index determining circuit, routine, or application 440, into the intersecting circuit, routine, or application 470. Then, under control of the controller 420, the first document bit index is selected from the master bit index portion 432 of the memory 430 as the current document bit index and input to the intersecting circuit, routine, or application 470. The intersecting circuit, routine, or application 470 determines the intersection of the search string bit index and the current document bit index.

Next, under control of the controller 420, the intersection of the search string bit index and the current document bit index and the search string bit index are input into the comparing circuit, routine, or application 460. The comparing circuit, routine, or application 460 determines whether the intersection of the search string bit index and the current document bit index is sufficiently equal to the search string bit index. When the intersection of the search string bit index and the current document bit index is not sufficiently equal to the search string bit index, the next document bit index is selected from the master bit index portion 432 of the memory 430 as the current document bit index. When every document bit index has been selected, or if the index portion 432 is empty, the search is complete and, under control of the controller 420, all of the marked grouped units, sentences, paragraphs, and documents are stored in the results portion 436 of the memory 430.

Whenever the intersection of the search string bit index and the current document bit index is sufficiently equal to the search string bit index, the marking circuit, routine, or application 480 marks the current document in the master bit index portion 432 of the memory 430 to indicate that that document matches the search string. Then, under the control of the controller 420, the first paragraph bit index of the matching current document is selected as the current paragraph bit index and input from the master bit index portion 432 of the memory 430 into the intersecting circuit, routine, or application 470. The intersecting circuit, routine, or application 470 determines the intersection of the search string bit index and the current paragraph bit index.

Next, under control of the controller 420, the intersection of the search string bit index and the current paragraph bit index is are input into the comparing circuit, routine, or application 460. The comparing circuit, routine, or application 460 determines whether the intersection of the search string bit index and the current paragraph bit index is sufficiently equal to the search string bit index. When the intersection of the search string bit index and the current paragraph bit index is not sufficiently equal to the search string bit index, the next paragraph bit index of the current document is selected from the master bit index portion 432 of the memory 430 as the current paragraph bit index. Once every paragraph bit index of the current document has been searched, the next document bit index is selected from the master bit index portion 432 of the memory 430, as described above.

Whenever the intersection of the search string bit index and the current paragraph bit index is sufficiently equal to the search string bit index, the marking circuit, routine, or application 480 marks the current paragraph in the master bit index portion 432 of the memory 430 to indicate that the current paragraph matches the search string. Then, under the control of the controller 420, the first sentence bit index of the matching current paragraph is selected as the current sentence bit index and input from the master bit index portion 432 of the memory 430 into the intersecting circuit, routine, or application 470. The intersecting circuit, routine, or application 470 determines the intersection of the search string bit index and the current sentence bit index.

Next, under control of the controller 420, the intersection of the search string bit index and the current sentence bit index is input into the comparing circuit, routine, or application 460. The comparing circuit, routine, or application 460 determines whether the intersection of the search string bit index and the current sentence bit index is sufficiently equal to the search string bit index. When the intersection of the search string bit index and the current sentence bit index is not sufficiently equal to the search string bit index, the next sentence bit index of the current paragraph is selected from the master bit index portion 432 of the memory 430 as the current sentence bit index. When every sentence bit index of the current paragraph has been searched, the next paragraph bit index is selected from the master bit index portion 432 of the memory 430, as described above.

Whenever, the intersection of the search string bit index and the current sentence bit index is sufficiently equal to the search string bit index, the marking circuit, routine, or application 480 marks the current sentence in the master bit index portion 432 of the memory 430 to indicate that the sentence matches the search string. Then, under the control of the controller 420, the first grouped unit bit index of the matching current sentence is selected as the current grouped unit bit index and input from the master bit index portion 432 of the memory 430 into the intersecting circuit, routine, or application 470. The intersecting circuit, routine, or application 470 determines the intersection of the search string bit index and the current grouped unit bit index.

Next, under control of the controller 420, the intersection of the search string bit index and the current grouped unit bit index is input into the comparing circuit, routine, or application 460. The comparing circuit, routine, or application 460 determines whether the intersection of the search string bit index and the current grouped unit bit index is sufficiently equal to the search string bit index. When the intersection of the search string bit index and the current grouped unit bit index is not sufficiently equal to the search string bit index, the next grouped unit bit index of the current sentence is selected from the master bit index portion 432 of the memory 430 as the current grouped unit bit index.

If the intersection of the search string bit index and the current grouped unit bit index is sufficiently equal to the search string bit index, the marking circuit, routine, or application 480 marks the current grouped unit in the master bit index portion 432 of the memory 430 to indicate that the current grouped unit matches the search string. Then, under the control of the controller 420, the next grouped unit bit index of the matching current sentence is selected as the current grouped unit bit index and searched, as above. When every grouped unit bit index of the current sentence has been searched, the next sentence bit index is selected from the master bit index portion 432 of the memory 430 as described above.

It should be appreciated that, depending on cost or other design constraints, one or more of the above-described elements of the string searching system 400 may be combined into a single element or divided into multiple elements where appropriate.

It should be appreciated that the systems and methods according to this invention are not limited to the above-described exemplary embodiments. For instance, in various exemplary embodiments, the comparing circuit, routine, or application might determine that a grouped unit, sentence, paragraph, or document is sufficiently equal only if 100% of the intersection of the search string bit index and the grouped unit, sentence, paragraph, or document bit index and the search string bit index are equal. These embodiments would yield a number of accurate search results. However, in other various exemplary embodiments some percentage less than 100% (determined, for example, by a confidence value) of the intersection of the search string bit index and the grouped unit, sentence, paragraph, or document bit index and the search string bit index maybe considered substantially equal. These embodiments would yield a larger number of less accurate search results.

Furthermore, it should be appreciated that systems and methods according to this invention are not specifically limited to documents containing text. For example, a graphic document such as a photograph may be appropriately broken down into a language and grammar and indexed in a similar manner. For instance, the subject, location, background, foreground, colors, and various other characteristics of the image correspond to, or constitute the elements. The elements would be assigned bit indices and indexed in a master bit index. Then, a user would be able to enter a search string, for example, "girl in Paris." According to the language, the search string would be converted into a bit index representing the union of girl, subject, Paris, and location or background (assuming that in the relevant language and grammar "girl" is the "subject" of the photo and "Paris" is the "location" or "background" of the photo). Then, a device according this alternative exemplary embodiment would return as a match each indexed graphic document containing a girl in Paris.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the invention is intended to embrace all known or later-developed alternatives, modifications variations, improvements, and/or substantial equivalents.

What is claimed is:

1. A computer-executable method for indexing at least one string containing a language having a vocabulary and a grammar for subsequent retrieval comprising:
 receiving at least one input string containing a language having a vocabulary and a grammar;
 dividing each string into a plurality of component parts according to the grammar, wherein each component part includes at least one word and at least one grammatical relationship of the at least one word within the language of the input string;
 determining a bit index for each component part;
 unioning, for each at least one set of component parts, the bit indices of the component parts within that set of component parts into a bit index for that set of component parts; and
 recording the bit index for the at least one set of component parts in a memory for subsequent use in document retrieval.

2. The method of claim 1, wherein the at least one string comprises at least one document containing text.

3. The method of claim 1, wherein the each of the at least one set of component parts represents a level selected from a group of levels of the input string consisting of a sentence level, a paragraph level, and a document level.

4. The method of claim 1, wherein dividing that string into a plurality of component parts comprises dividing that string into a plurality of grouped units.

5. The method of claim 4, wherein dividing that string into a plurality of component parts further comprises dividing each grouped unit into a plurality of elements.

6. The method of claim 5, wherein unioning, for each at least one set of component parts, the bit indices of the component parts within that set of component parts further comprises unioning, for each grouped unit, the bit indices of the elements of that grouped unit to form a bit index for that grouped unit.

7. The method of claim 6, further comprising combining the at least one grouped unit into at least one sentence, wherein unioning, for each at least one set of component parts, the bit indices of the component parts within that set of component parts further comprises unioning, for each at least one sentence, the bit indices of the at least one grouped unit of that sentence to form a bit index for that sentence.

8. The method of claim 7, further comprising combining the at least one sentence into at least one paragraph, wherein unioning, for each at least one set of component parts, the bit indices of the component parts within that set of component parts further comprises unioning, for each of the at least one paragraph, the bit indices of the at least one sentence of that paragraph to form a bit index for that paragraph.

9. The method of claim 8, further comprising combining the at least one paragraph into at least one document, wherein unioning, for each at least one set of component parts, the bit indices of the component parts within that set of component parts further comprises unioning, for each of the at least one document, the bit indices of the at least one paragraph of that document to form a bit index for that document.

10. The method of claim 5, wherein unioning, for each at least one set of component parts, the bit indices of the component parts within that set of component parts further comprises unioning the bit indices of a number of elements, the number of elements associated with a given grouped unit, to form a bit index for that grouped unit.

11. The method of claim 10, wherein unioning, for each at least one set of component parts, the bit indices of the component parts within that set of component parts further comprises unioning the bit indices of a number of grouped units, the number of grouped units associated with a given sentence, to form a bit index for that sentence.

12. The method of claim 11, wherein unioning, for each at least one set of component parts, the bit indices of the component parts within that set of component parts further comprises unioning the bit indices of a number of sentences, the number of sentences associated with a given paragraph, to form a bit index for that paragraph.

13. The method of claim 12, wherein unioning, for each at least one set of component parts, the bit indices of the component parts within that set of component parts further comprises unioning the bit indices of a number of paragraphs, the number of paragraphs associated with a given document, to form a bit index for that document.

14. The method of claim 1, wherein dividing that string into a plurality of component parts comprises dividing that string into at least one sentence.

15. The method of claim 14, wherein unioning, for each at least one set of component parts, the bit indices of the component parts within that set of component parts comprises unioning the bit indices of a number of elements, the number of elements associated with a given sentence, to form a bit index for that sentence.

16. The method of claim 1, wherein dividing that string into a plurality of component parts comprises dividing that string into at least one paragraph.

17. The method of claim 16, wherein unioning, for each at least one set of component parts, the bit indices of the component parts within that set of component parts comprises unioning the bit indices of a number of elements, the number of elements associated with a given paragraph, to form a bit index for that paragraph.

18. A computer-executed string indexing system that indexes at least one string containing a language having a vocabulary and a grammar for subsequent retrieval, comprising:
    a dividing circuit, routine, or application that inputs the at least one string, divides the string according to the grammar and outputs at least one component part, each component part including at least one word and at least one grammatical relationship of the at least one word within the language of the input string;
    an element index assigning circuit, routine, or application that assigns an index value to each component part;
    an index converting circuit, routine, or application that converts each index value into a corresponding bit index;
    a unioning circuit, routine, or application that inputs two or more bit indices and outputs a bit index representing the union of the input two or more bit indices; and
    a memory that stores the bit index for subsequent retrieval.

19. The system of claim 18, wherein the dividing circuit, routine, or application comprises:
    a parsing circuit, routine, or application that inputs the at least one string and outputs at least one corresponding set of sub-parts for each of the at least one string;
    a deconstructing circuit, routine, or application that inputs one or more sub-parts and breaks each sub-part unit into component parts.

20. The system of claim 18, further comprising a presence-determining circuit, routine, or application that inputs a component part and determines whether that component part is present in a list of the assigned index values.

21. The system of claim 18, wherein the at least one string comprises at least one document containing text.

22. The system of claim 19, wherein the parsing circuit, routine, or application divides, for each string, that string into a plurality of grouped units as the sub-parts.

23. The system of claim 22, wherein the deconstructing circuit, routine, or application inputs a grouped unit as each sub-part and, for that grouped unit, outputs a set of at least one element contained within that grouped unit as the component parts.

24. The system of claim 23, wherein the element index assigning circuit, routine, or application assigns each element a unique element index as the index value.

25. The system of claim 24, wherein the index converting circuit, routine, or application, for each element, converts that element's unique element index into a corresponding bit index.

26. The system of claim 25, wherein the unioning circuit, routine, or application unions the bit indices of a set of at least one element of a given grouped unit to form a bit index for that grouped unit.

27. The system of claim 26, wherein the unioning circuit, routine, or application unions the bit indices of a number of grouped units, the number of grouped units associated with a given sentence, to form a bit index for that sentence.

28. The system of claim 27, wherein the unioning circuit, routine, or application unions the bit indices of a number of sentences, the number of sentences associated with a given paragraph, to form a bit index for that paragraph.

29. The system of claim 28, wherein the unioning circuit, routine, or application unions the bit indices of a number of paragraphs, the number of paragraphs associated with a given document, to form a bit index for that document.

30. The system of claim 18, wherein the parsing circuit, routine, or application divides the string into at least one corresponding set of at least one sentence as the at least one component part.

31. The system of claim 18, wherein the parsing circuit, routine, or application divides the string into at least one corresponding set of at least one paragraph as the at least one component part.

32. The method of claim 1, further comprising:
   determining a bit index of a search string;
   retrieving a bit index of an indexed string;
   determining an intersection of the search string bit index and the indexed string bit index; and
   comparing the intersection of the search string bit index and the indexed string bit index with the search string bit index.

33. The system of claim 18, further comprising:
   a bit index determining circuit, routine, or application that inputs the search string and determines a bit index for the search string;
   an intersecting circuit, routine, or application that inputs two or more bit indices and determines an intersection of the two or more bit indices; and
   a comparing circuit, routine, or application that inputs at least one bit index and determines whether that at least one bit index at least partially matches the bit index for the search string.

34. A storage medium storing a set of program instructions executable on a data processing device and usable for indexing at least one string over a language having a vocabulary and a grammar for subsequent retrieval, the set of program instructions comprising:
   instructions for receiving at least one input string containing a language having a vocabulary and a grammar;
   instructions for dividing each string into a plurality of component parts according to the grammar, each component part including at least one word and at least one grammatical relationship of the at least one word within the language of the input string;
   instructions for determining a bit index for each component part;
   instructions for unioning, for each at least one set of component parts, the bit indices of the component parts within that set of component parts into a bit index for that set of component parts; and
   instructions for recording the bit index for the set in a memory for subsequent use in document retrieval.

* * * * *